United States Patent
Anemikos et al.

(10) Patent No.: US 8,097,474 B2
(45) Date of Patent: Jan. 17, 2012

(54) INTEGRATED CIRCUIT CHIP DESIGN FLOW METHODOLOGY INCLUDING INSERTION OF ON-CHIP OR SCRIBE LINE WIRELESS PROCESS MONITORING AND FEEDBACK CIRCUITRY

(75) Inventors: Theodoros Anemikos, Milton, VT (US); Ezra D. B. Hall, Richmond, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 12/343,686

(22) Filed: Dec. 24, 2008

(65) Prior Publication Data

US 2009/0239313 A1    Sep. 24, 2009

Related U.S. Application Data

(63) Continuation-in-part of application No. 12/053,705, filed on Mar. 24, 2008.

(51) Int. Cl.
*H01L 21/66* (2006.01)
(52) U.S. Cl. .......... 438/5; 257/E21.525; 716/4
(58) Field of Classification Search .......... 716/100–110; 438/5; 257/E21.525
See application file for complete search history.

(56) References Cited

U.S. PATENT DOCUMENTS

| | | | |
|---|---|---|---|
| 5,367,468 A * | 11/1994 | Fukasawa et al. | ............ 716/102 |
| 6,182,510 B1 | 2/2001 | Stanke et al. | |
| 6,686,755 B2 | 2/2004 | White et al. | |
| 6,768,312 B2 | 7/2004 | Sun et al. | |
| 6,829,559 B2 | 12/2004 | Bultman et al. | |
| 6,913,938 B2 | 7/2005 | Shanmugasundram et al. | |
| 6,961,626 B1 | 11/2005 | Paik | |
| 7,220,990 B2 | 5/2007 | Aghababazadeh et al. | |
| 2003/0042915 A1 | 3/2003 | Kong et al. | |
| 2006/0234398 A1 * | 10/2006 | Gluschenkov et al. | ........... 438/5 |
| 2007/0224712 A1 | 9/2007 | Kaushal et al. | |

OTHER PUBLICATIONS

Anemikos et al., U.S. Appl. No. 12/053,705, Office Action Communication, Jun. 24, 2011, 12 pages.

* cited by examiner

*Primary Examiner* — A. Sefer
*Assistant Examiner* — Monica D Harrison
(74) *Attorney, Agent, or Firm* — Gibb I.P. Law Firm, LLC

(57) ABSTRACT

Disclosed are embodiments of a design and manufacturing system and an associated method that allow for design analysis and for insertion, during wafer manufacture, of intra-process monitoring circuitry. These embodiments use a library of pre-qualified intra-process monitoring circuits and a cross-correlation table that links different monitoring circuits with different IC chip components. Specifically, these embodiments analyze integrated circuit chip design data to identify the components designed into the chip. Then, one or more intra-process monitoring circuits are selected from the library and the design data is modified to include the selected monitoring circuit(s).

20 Claims, 15 Drawing Sheets

INTEGRATED CIRCUIT CHIP DESIGN FLOW METHODOLOGY INCLUDING INSERTION OF ON-CHIP OR SCRIBE LINE WIRELESS PROCESS MONITORING AND FEEDBACK CIRCUITRY

CROSS-REFERENCE TO RELATED APPLICATIONS

The present invention claims the benefit under 35 U.S.C. §120 as a continuation-in-part of presently pending U.S. patent application Ser. No. 12/053,705 entitled "SYSTEM AND METHOD FOR WIRELESS AND DYNAMIC INTRA-PROCESS MEASUREMENT OF INTEGRATED CIRCUIT PARAMETERS", filed on Mar. 24, 2008 with multiple common inventors, the entire teachings of which are incorporated herein by reference.

BACKGROUND

1. Field of the Invention

The embodiments of the invention generally relate to intra-process monitoring circuits and, more particularly, to an integrated circuit (IC) chip design and manufacturing system and an associated design and manufacturing flow method that provide for chip design analysis and insertion of on-chip and/or within scribe line intra-process monitoring circuits.

2. Description of the Related Art

As lithographic geometries are reduced for each successive semiconductor process generation, the effects of process variability have become significant first order issues. Designers are faced with creating tradeoffs between timing margin, power, and performance. Tighter process controls would enable lower power, higher performance, and/or higher yielding products. The ability to control processes to tighter tolerances is limited by an inability to obtain actual inline (i.e., intra-process) integrated circuit parameter measurements for a given wafer or die or for a given site on a given wafer or die.

Current techniques for taking integrated circuit parameter measurements utilize wired mechanical probing systems. For example, a standard probe with multiple pads (e.g., 25 pads) is used to probe a given kerf having a multitude of corresponding pad sets (e.g., 25 pad sets), according the number of macros that are available for measurements. The number of sites sampled per wafer lot is typically minimized due to the time and expense associated with such mechanical probing, the available capacity at the probing stations, and the invariable mechanical damage imparted on probed sites. These kerf measurements are used for wafer disposition and for both feedforward and feedback control loops to adjust manufacturing variables for control of such parameters.

Unfortunately, the limited frequency and number of sites sampled limits the tightness of control through such historical methods. Additionally, in-situ measurement during actual wafer processing is prevented, thereby eliminating the possibility of live process adjustment and/or end point detection based on direct on wafer parametric measurement. To solve this problem, U.S. patent application Ser. No. 12/053,705 disclosed embodiments of a system that incorporates passive on-wafer (i.e., on-chip and/or within scribe line) circuits that allow for wireless and dynamic intra-process (i.e., during and/or between process steps) measurements of integrated circuit parameters. Given the disclosed intra-process monitoring circuits of U.S. patent application Ser. No. 12/053,705 as well as other similar intra-process monitoring circuits, there is also now a need in the art for an improved design and manufacturing system as well as an improved design and manufacturing flow method that provide for chip design analysis and on-chip or within scribe line insertion of intra-process monitoring circuitry.

SUMMARY

In view of the foregoing, disclosed herein are embodiments of a design and manufacturing system and an associated design and manufacturing flow method that allow for design analysis and for insertion, during wafer manufacture, of intra-process monitoring circuitry. These embodiments incorporate the use of a library of pre-qualified intra-process monitoring circuits and a cross-correlation table that links different monitoring circuits with different IC chip components. Specifically, these embodiments analyze integrated circuit (IC) chip design data to identify the IC components designed into the chip. Then, one or more intra-process monitoring circuits are selected from the library and the design data is modified to include the selected monitoring circuit(s). Finally, a test program extension is generated for intra-process monitoring of at least one parameter using the selected monitoring circuit(s) and the manufacturing routing instructions are modified to incorporate the test program extension.

More particularly, disclosed herein are embodiments of a system for designing and manufacturing an integrated circuit chip. The system embodiments comprise a library, a design data analyzer, an intra-process monitoring circuit selector and a design data editor. The library can contain a set of pre-qualified intra-process monitoring circuits. The design data analyzer can analyze IC chip design data. This IC chip design data can be representative of a particular design for an IC chip comprising a plurality of IC chip components. The design data analyzer can specifically analyze the design data to identify the various IC chip components within the design. The intra-process monitoring circuit selector can select one or more intra-process monitoring circuits from the library. The design data editor can then modify the design data to incorporate the selected intra-process monitoring circuit(s) in order to allow intra-process monitoring of at least one parameter of at least one of the chip components during wafer fabrication. Other aspects of the system embodiments can include, but are not limited to, a test program generator, a routing instructions generator, and a process controller. The test program generator can generate an extension to a test program for monitoring one or more parameters using the selected wireless monitoring circuit(s). The routing instructions generator can modify manufacturing routing instructions for wafer fabrication so as to incorporate the monitoring circuit(s) and the test program extension. The process controller can initiate wafer manufacturing and can further adjust one or more manufacturing process steps, based on results obtained from performance of the test program extension, during wafer fabrication.

Also disclosed herein are embodiments of an integrated circuit chip design and manufacturing flow method. The method embodiments can comprises analyzing design data. This design data can be representative of a particular design for IC chip comprising a plurality of IC chip components. The process of analyzing the design data can comprise identifying the various IC chip components contained in the design. Then, at least one intra-process monitoring circuit is selected from a library comprising a set of pre-qualified intra-process monitoring circuits. Once the intra-process monitoring circuit(s) are selected, the design data is modified to incorporate the selected intra-process monitoring circuit(s) in order to allow wireless intra-process monitoring of at least one parameter of at least one of the components, during wafer fabrication. Other aspects of the method embodiments can include, but are not limited to, generating an extension to a test program to allow for wireless intra-process monitoring of at least one parameter using the selected wireless monitoring circuit(s); modifying routing instructions to incorporate the monitoring circuit(s) and the extension; initiating wafer manufacturing; performing the test program extension during wafer manufacturing; and, based on the results of the test program extension, adjusting at least one manufacturing process step.

BRIEF DESCRIPTION OF THE SEVERAL VIEWS OF THE DRAWINGS

The embodiments of the invention will be better understood from the following detailed description with reference to the drawings, which are not necessarily drawing to scale and in which.

DETAILED DESCRIPTION

The embodiments of the invention and the various features and advantageous details thereof are explained more fully with reference to the non-limiting embodiments that are illustrated in the accompanying drawings and detailed in the following description.

As mentioned above, as lithographic geometries are reduced for each successive semiconductor process generation, the effects of process variability have become significant first order issues. Designers are faced with creating tradeoffs between timing margin, power, and performance. Tighter process controls would enable lower power, higher performance, and/or higher yielding products. The ability to control processes to tighter tolerances is limited by an inability to obtain actual inline (i.e., intra-process) integrated circuit parameter measurements for a given wafer or die or for a given site on a given wafer or die Current techniques for taking integrated circuit parameter measurements utilize wired mechanical probing systems. For example, a standard probe with multiple pads (e.g., 25 pads) is used to probe a given kerf having a multitude of corresponding pad sets (e.g., 25 pad sets), according the number of macros that are available for measurements. The number of sites sampled per wafer lot is typically minimized due to the time and expense associated with such mechanical probing, the available capacity at the probing stations, and the invariable mechanical damage imparted on probed sites. These kerf measurements are used for wafer disposition and for both feedforward and feedback control loops to adjust manufacturing variables for control of such parameters.

Unfortunately, the limited frequency and number of sites sampled limits the tightness of control through such historical methods. Additionally, in-situ measurement during actual wafer processing is prevented, thereby eliminating the possibility of live process adjustment and/or end point detection based on direct on wafer parametric measurement. To solve this problem, U.S. patent application Ser. No. 12/053,705 disclosed embodiments of a system that incorporates passive on-wafer (i.e., on-chip and/or within scribe line) circuits that allow for wireless and dynamic intra-process (i.e., during and/or between process steps) measurements of integrated circuit parameters. Given the disclosed intra-process monitoring circuits of U.S. patent application Ser. No. 12/053,705 as well as other similar intra-process monitoring circuits, there is also now a need in the art for an improved design and manufacturing system as well as an improved design and manufacturing flow method that provide for chip design analysis and on-chip or within scribe line insertion of intra-process monitoring circuitry.

Previous Disclosure Repeated from U.S. Patent Application Ser. No. 12/053,705

Figure 1:
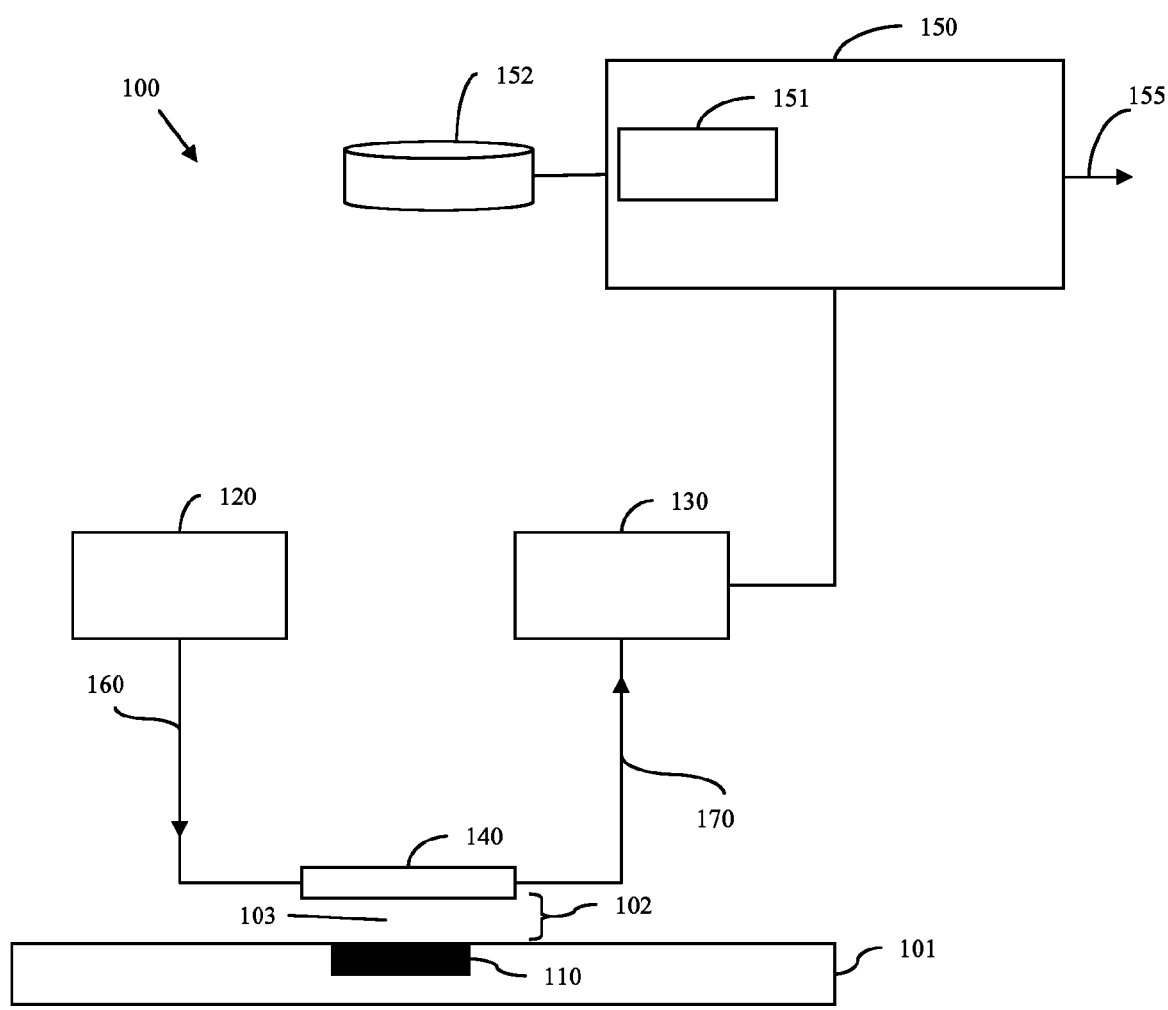
FIG. 1 is a block diagram illustrating a general embodiment of a system for wireless measurement of integrated circuit parameters.

More particularly, referring to FIG. 1, disclosed herein are embodiments of a system 100 for wireless measurement of integrated circuit parameters. Generally, the system 100 embodiments comprise a stimulus source 120, a wireless-interrogation unit 140, a sensor 130, an analyzer 150 and a wafer 101 from which the integrated circuit parameter measurements are to be taken. The wafer 101 comprises a passive circuit 110 with a predetermined sensitivity to process variations in one or more integrated circuit parameters.

These integrated circuit parameters can comprise one or more physical and/or electrical integrated circuit parameters, such as metal dimensions, via or contact dimensions, polysilicon structure dimensions, sheet resistances, etc. The passive circuit 110 can further be adapted to exhibit, in response to a given stimulus 160, a given type of circuit behavior 170 that can be wireless detected. Specifically, the passive circuit 110 can be formed from one or more of the wafer layers (e.g., the semiconductor substrate, polysilicon layer, metal layers, dielectric layers, etc.) and can comprise, for example, an inductor-capacitor-resistor (LCR) circuit, a transmission line, or any other variety of passive circuit (or passive-active circuit combination) capable of being wireless interrogated. The predetermined sensitivity to process variations in the one or more integrated circuit parameters is demonstrated by variations in the exhibited circuit behavior 170, in response to the applied stimulus 160. That is, a variation in a given physical or electrical parameter over what is optimal will result in a corresponding variation in the wirelessly detectable circuit behavior, when the stimulus 160 is applied to the circuit 110.

Figure 2:
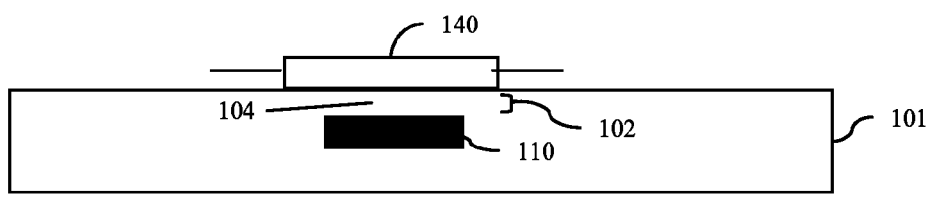
FIG. 2 is a block diagram illustrating an alternative configuration for the system of FIG. 1.

The interrogation unit 140 can be adapted to wirelessly detect this given type of circuit behavior. Specifically, the interrogation unit 140 can be placed adjacent to the wafer 101 such the passive circuit 110 and interrogation unit 140 are in close proximity, but physically separated. For example, a space 102 that has a predetermined height and is filled with either air 103 (as illustrated in FIG. 1) or a dielectric material 104 (as illustrated in FIG. 2) can physically separate the passive circuit 110 from the interrogation unit 140. Additionally, the passive circuit 110 and interrogation unit 140 can be uniquely configured so as to allow wireless communication or coupling for circuit behavior detection. For example, the passive circuit 110 and interrogation unit 140 can be inductively coupled.

Both the stimulus source 120 and the sensor 130 can be electrically connected to or otherwise in communication with the interrogation unit 140. The stimulus source 120 can be adapted to generate and apply a given stimulus 160 to the passive circuit 110 through the interrogation unit 140. The sensor 130 can be adapted to sense and measure the actual behavior 170 exhibited by the passive circuit 110 in response to the stimulus 160 (as detected by the interrogation unit 140). It should be understand that the stimulus source 120 and sensor 140 can comprise discrete transmit and receive units connected to the interrogation unit 140, as illustrated. Alternatively, the stimulus source 120 and sensor 140 can comprise a combined transmit-receive unit.

The analyzer 150 can be in communication with the sensor 130 and can be adapted to determine the value(s) for one or more integrated circuit parameters based on the difference between the expected behavior (i.e., the optimal circuit behavior in the absence of process variations) and the actual behavior 170 exhibited by the passive circuit 110 in response to the stimulus 121. In making this determination, the analyzer 150 can first normalize the measured data 170 (e.g., using a data normalizer 151) to account for scaling, offset and/or noise errors, which would prevent a direct correlation of parametric values to measurements. Such scaling, offset and noise errors can occur due to placement of the interrogation unit 140 and its distance from the passive circuit 110. Furthermore, the analyzer 150 can access a database 152 of simulation results that predict not only circuit 110 behavior in the absence of process variations and but also in the presence of different process variations. The output 155 of the analyzer (i.e., the intra-process integrated circuit parameter measurements) can be used to provide immediate control for parametric centering through in-process correction, for end point detection, for feedback corrections to prior process steps and/or for feedforward corrections to subsequent process steps.

Figure 3:
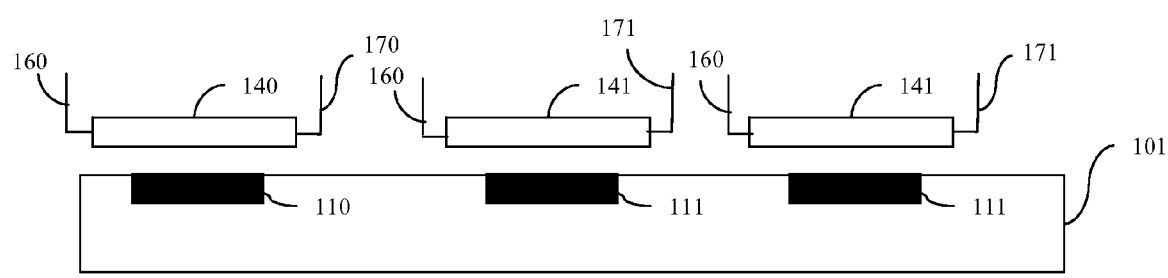
FIG. 3 is a block diagram illustrating another alternative configuration for the system of FIG. 1.

As described above, the general system 100 embodiments comprise only one passive circuit 110. However, it is anticipated that the system 100 will ideally comprise one or more additional passive circuits 111 to be interrogated by the same interrogation unit 140 or different interrogation units 141 at the same time in order to more accurately determine values of the integrated circuit parameters. For example, referring to FIG. 3 in combination with FIG. 1, the system 100 can further comprise one or more additional interrogation units 141 similarly adapted to wirelessly detect the given type of circuit behavior. The wafer 101 can further comprise one or more additional passive circuits 111 similarly adapted to exhibit the given type of circuit behavior in response to the stimulus 121, but with different predetermined sensitivities to the process variations in the one or more integrated circuit parameters. Finally, the analyzer 150 can further be adapted to more accurately determine the value(s) for the one or more integrated circuit parameters based, not only on the actual behavior 170 exhibited by the first passive circuit 110 (as detected by the first interrogation unit 140), but also on the difference between the expected behavior and the actual behavior 171 exhibited by the additional passive circuit(s) 111 in response to the stimulus 160 (as detected by the additional interrogation unit(s) 141).

Figure 4:
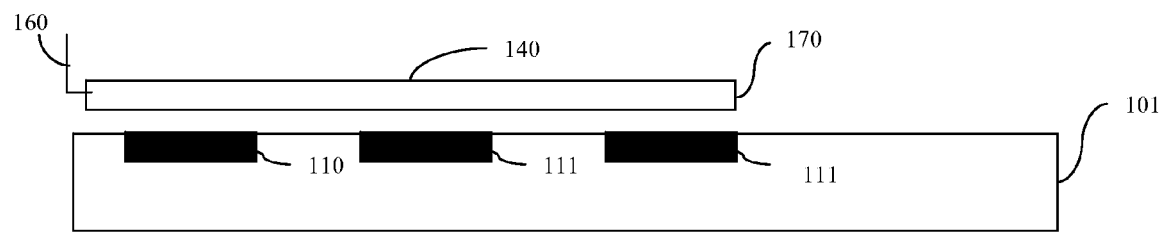
FIG. 4 is a block diagram illustrating yet another alternative configuration for the system of FIG. 1.

Alternatively, referring to FIG. 4 in combination with FIG. 1, the wafer 101 can further contain one or more additional passive circuit(s) 141 similarly adapted to exhibit the given type of circuit behavior in response to the stimulus 160 and with the same predetermined sensitivity to the process variations in the one or more integrated circuit parameter. However, in this case the additional passive circuit(s) 141 can be tuned differently than the passive circuit 110 so that the interrogation unit 140 can simultaneously interrogate the passive circuit 110 and the additional passive circuit(s) 111 and so that the analyzer 150 can more accurately determine the value(s) for the one or more integrated circuit parameters based, not only on the actual behavior 170 exhibited by the first passive circuit (as detected by the first interrogation unit), but also on the difference between the expected behavior and the actual behavior 170 exhibited by the additional passive circuit in response to the stimulus (as detected by the same interrogation unit 140). Because multiple passive circuits 110, 111 can be simultaneously interrogated, the present inline measuring technique provides higher sampling rates and tighter process controls over prior art inline measuring techniques.

Figure 5:
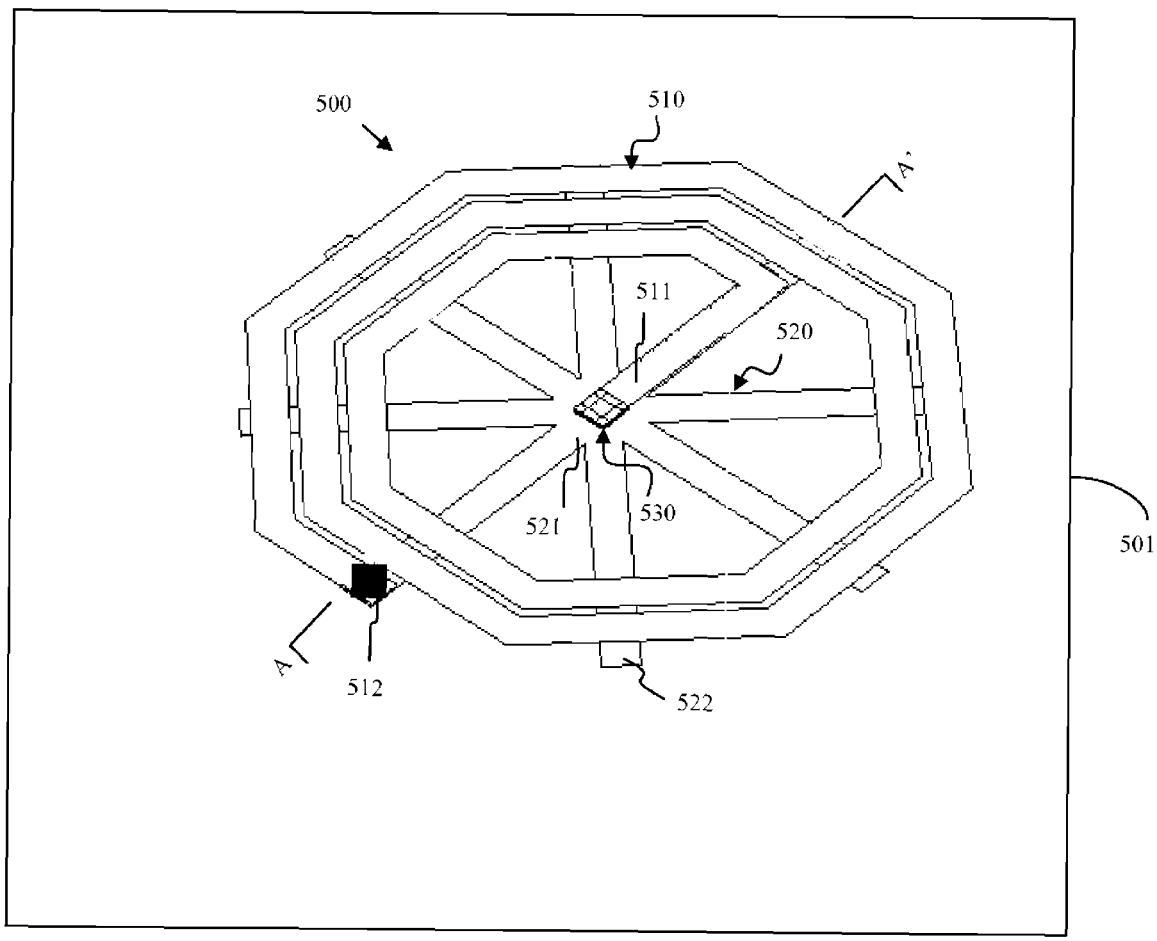
FIG. 5 is a diagram illustrating a top view of an exemplary passive resonator circuit that can be incorporated into the system and method embodiments for wireless measurement of integrated circuit parameters.
Figure 6:
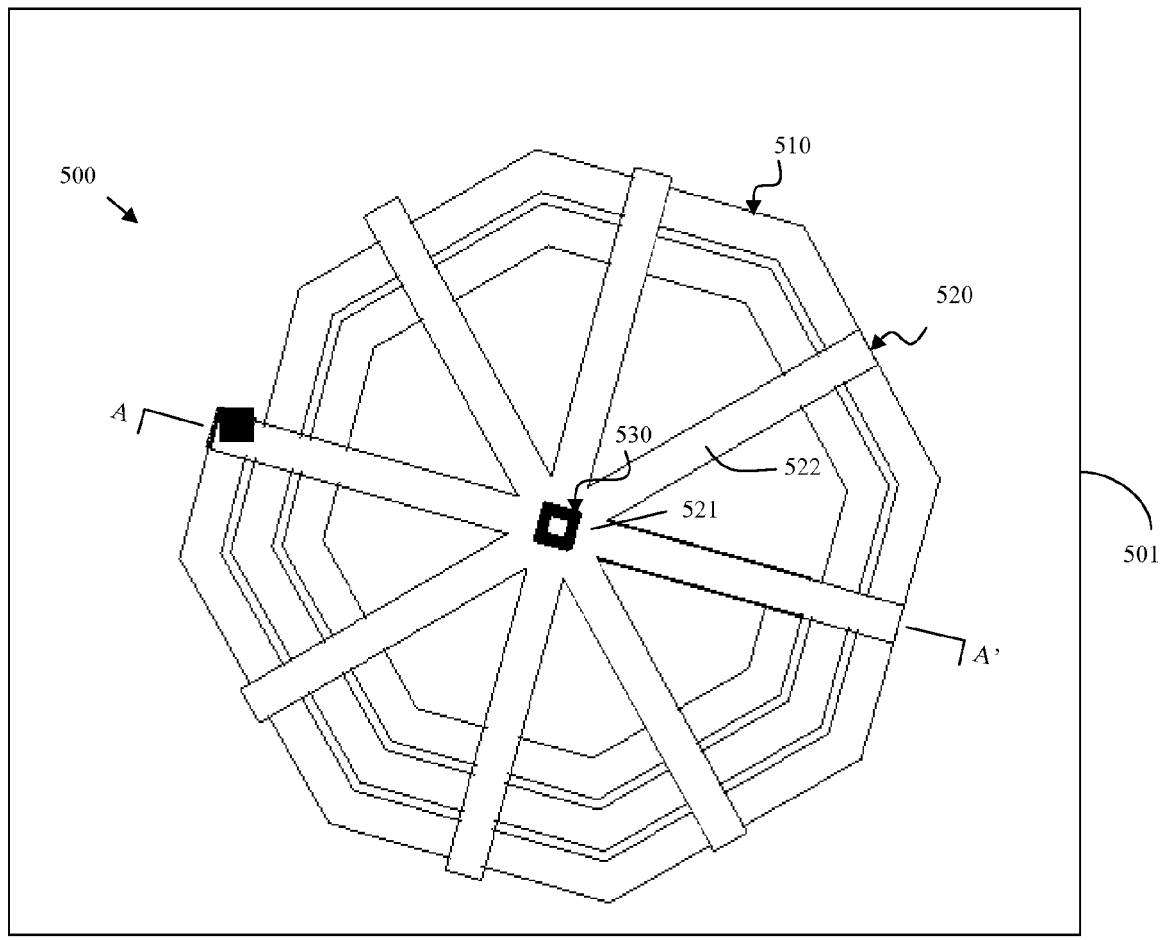
FIG. 6 is a diagram illustrating a bottom view of the exemplary passive resonator circuit of FIG. 3.
Figure 7:
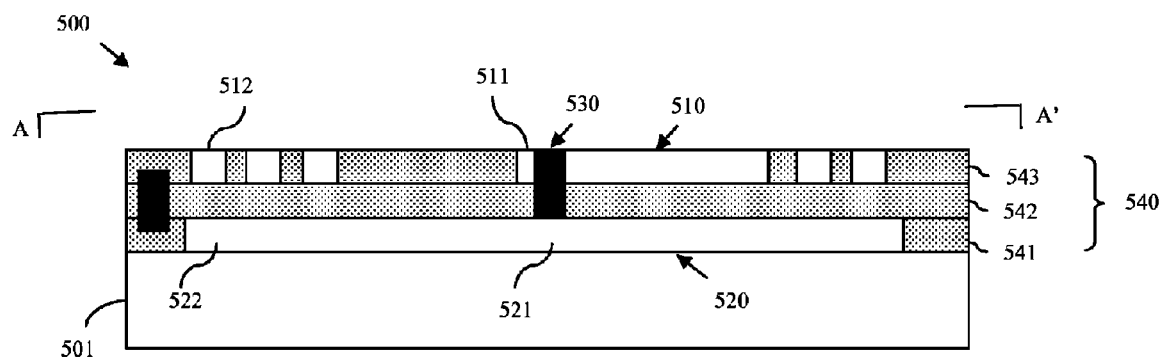
FIG. 7 is a diagram illustrating a cross-section view of the exemplary passive resonator circuit of FIG. 3.
Figure 8:
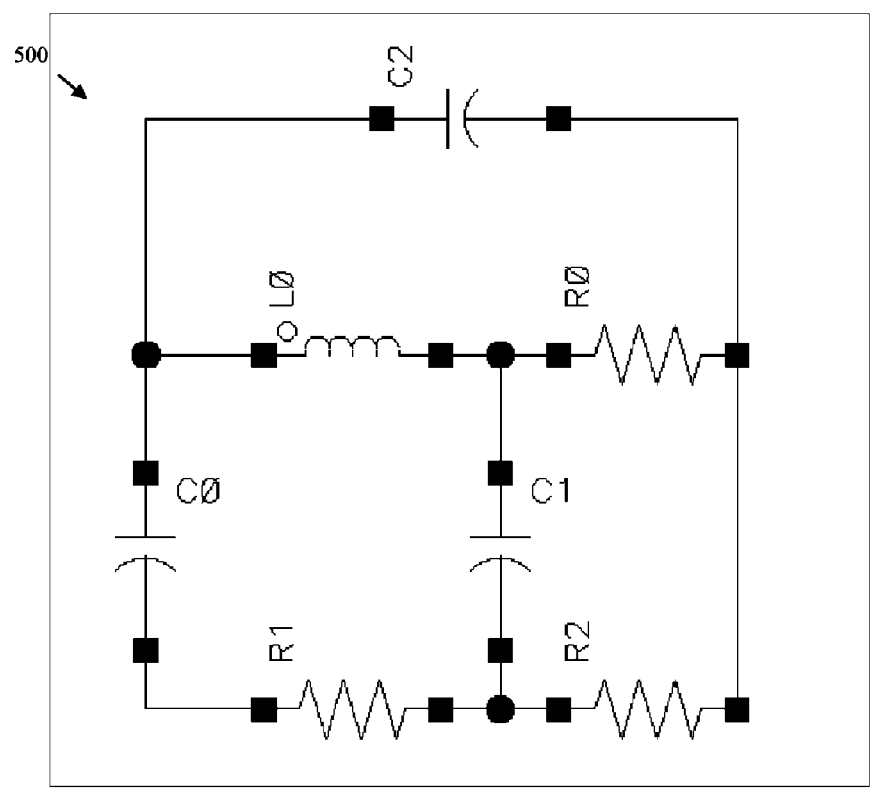
FIG. 8 is a schematic circuit diagram illustrating the exemplary passive resonator circuit of FIG. 3.

Also disclosed were exemplary passive circuit and, more particularly, a passive resonator, which can be incorporated into the system 100 of the present invention as item 110. FIG. 5 is a top view diagram of this exemplary passive resonator circuit 500. FIG. 6 is a bottom view diagram of this exemplary passive resonator circuit 500. FIG. 7 is a cross-section view diagram of this exemplary passive resonator circuit 500. Finally, FIG. 8 is a schematic circuit diagram of the exemplary passive resonator circuit 500.

Referring to FIGS. 5-8 in combination, this passive resonator 500 can comprise a substrate 501 (e.g., a wafer) and, on the substrate 501, at least one structure with resistive behavior (e.g., resistor 520), at least one structure having capacitive behavior (e.g., a capacitor 540, see FIG. 7 and discussion below) and at least one structure having inductive behavior (e.g., an inductor 510) that are all interconnected and configured to form an inductor-capacitor-resistor (LCR) circuit. Specifically, the resistor 520, capacitor 540 and inductor 510 of the LCR circuit can be interconnected and configured so that the LCR circuit exhibits, in response to an applied stimulus (e.g., radio frequency energy), resonant behavior that varies in a predictable manner as a function of the process variations in one or more integrated circuit parameter (e.g., in one or more physical and/or electrical integrated circuit parameters).

For example, as illustrated particularly in FIG. 7, the LCR circuit can comprise a three-layer structure comprising a dielectric layer 542 between a polysilicon resistor layer 541 and a metal inductor layer 543 such that the polysilicon resistor layer 541, the dielectric layer 542 and the metal inductor layer 543 in combination form the capacitor 540. The polysilicon resistor layer 541 can comprise a polysilicon resistor structure 520 with a first center section 521 and a plurality of second sections 522 extending radially from the first center section 521. The metal inductor layer 543 can comprise a spiral-shaped metal wire (i.e., an inductor 510) with an inner end 511 and an outer end 512. The polysilicon structure (i.e., the resistor 520) and spiral-shaped metal wire (i.e., the inductor 520) can be aligned vertically. A contact 530 extending vertically through the dielectric layer 542 can electrically connect the resistor 520 and the inductor 520 and, more particularly, can electrically connect the center section 521 of the resistor 520 with the inner end 511 of the inductor 510.

Figure 9:
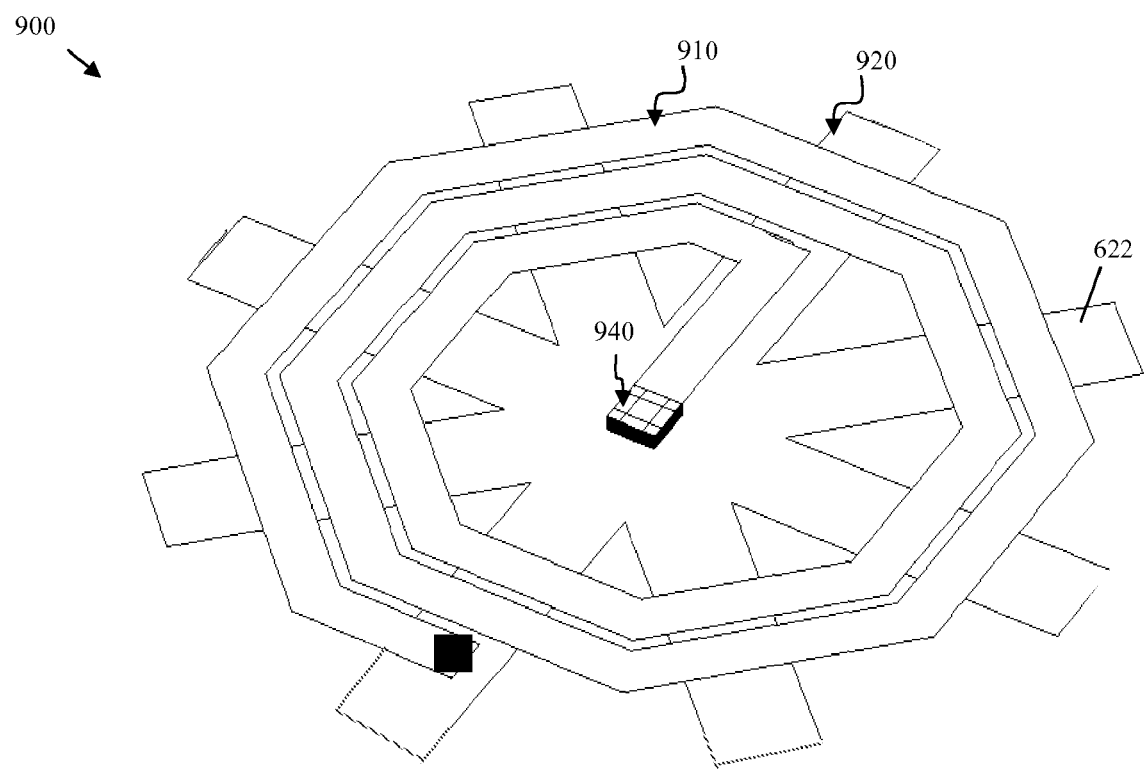
FIGS. 9-11 are diagrams illustrating similar passive resonator circuits with different process variation sensitivities.
Figure 10:
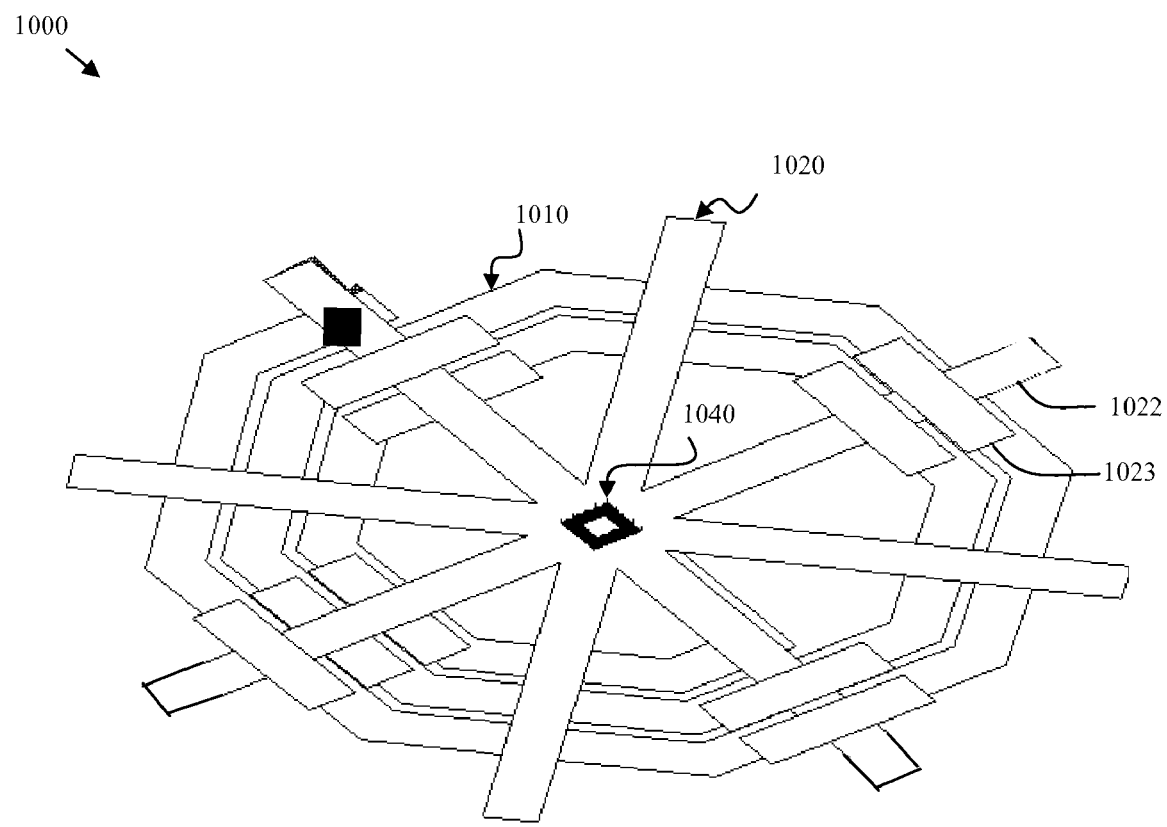
Figure 11:
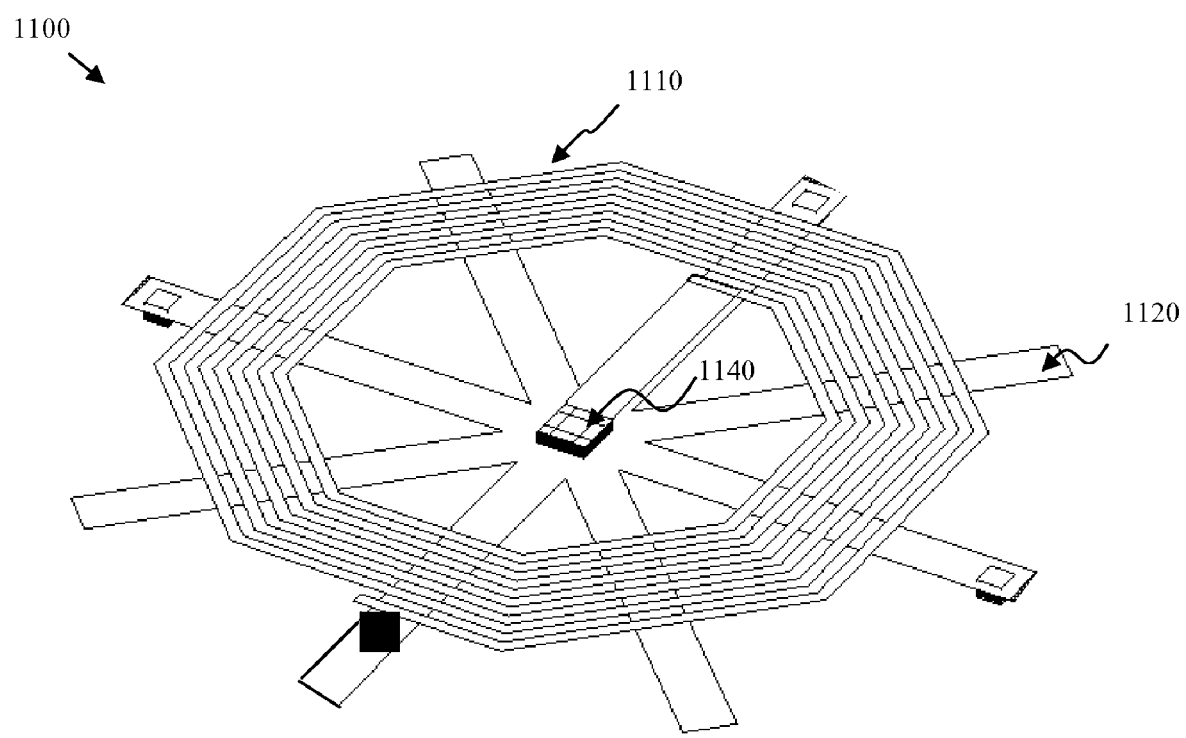

Furthermore, variations in the inductor 510, resistor 520 and capacitor 540 structures will alter the LCR circuit's sensitivity to specific process variations in the specific integrated circuit parameters, such as polysilicon sheet resistance, contact height and metal sheet resistance. For example, the passive resonator 500, as illustrated in FIGS. 5 and 7, may have a "default" sensitivity to metal sheet resistance in the metal layer 543 containing the inductor 510, to contact 530 height (i.e., to the thickness of the dielectric layer 542 creating the capacitor 540) and to polysilicon sheet resistance in the polysilicon layer 541 containing the resistor 520. However, as illustrated in FIG. 9, a similar resonator 900 can be formed with thicker sections 522. Thus, relative to the default sensitivities of the passive resonator 500 of FIG. 5, the passive resonator 900 of FIG. 9 will have decreased sensitivity to polysilicon sheet resistance, but increased sensitivity to contact 940 height, due to increased capacitance between the resistor 920 and inductor 910. As illustrated in FIG. 10, a similar resonator 1000 can be formed with additional polysilicon sections 1023 traversing the radial sections 1022 of the resistor 1020. Thus, relative to the default sensitivities of the passive resonator 500 of FIG. 5, the passive resonator 1000 of FIG. 10 will have increased sensitivity to contact 1040 height, due to the increased capacitance between the resistor 1020 and inductor 1010, but will maintain the default sensitivity to polysilicon sheet resistance. Finally, as illustrated in FIG. 11, a similar resonator 1100 can be formed with additional thinner spirals in the inductor 1110 coil. Thus, relative to the default sensitivities of the passive resonator 500 of FIG. 5, the passive resonator 1100 will have increased sensitivity to metal sheet resistance, but will maintain the same sensitivity to contact 1140 height (i.e., equivalent capacitance between the resistor 1120 and inductor 1110) and to polysilicon sheet resistance.

Figure 12:
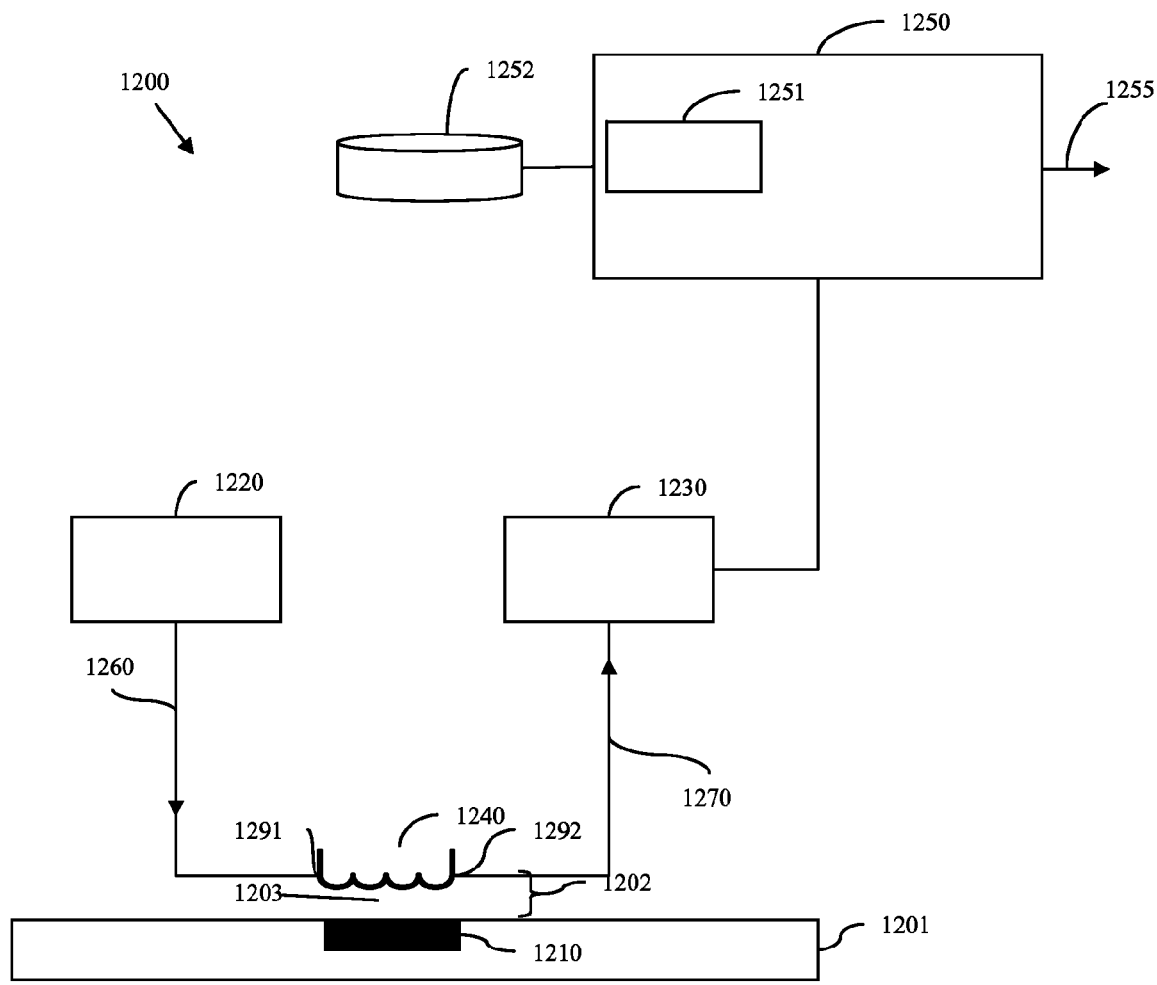
FIG. 12 is a block diagram illustrating a specific embodiment of the system for wireless measurement of integrated circuit parameters incorporating a passive resonator such as that illustrated in FIGS. 5-8.

Thus, referring to FIG. 12, an embodiment of the system 1200 of the present invention that incorporates the above-described passive resonator 500 or a similar passive resonator structure is also disclosed. The system 1200 can similarly comprise a stimulus source 1220, a wireless-interrogation unit 1240, a sensor 1230, an analyzer 1250 and a wafer 1201 from which the measurements are to be taken. The wafer 120 particularly comprises a passive resonator 1210, such as the passive resonator 500 described above and illustrated in FIG. 5, with a predetermined sensitivity to process variations in one or more integrated circuit parameters (e.g., in one or more physical and/or electrical integrated circuit parameters, such as polysilicon sheet resistance, contact height and metal sheet resistance). This passive resonator 1210 is adapted to exhibit resonant behavior in response to a stimulus 1260, such as radio frequency energy in the form of a radio frequency pulse or sine voltage. The predetermined sensitivity to process variations in the one or more integrated circuit parameters is demonstrated by variations in resonant behavior exhibited by the passive resonator 1210, in response to applied radio frequency energy 1260. That is, a variation in a given physical or electrical parameter (e.g., polysilicon sheet resistance, contact height or metal sheet resistance) over what is optimal will result in a corresponding variation in the wirelessly detectable resonant behavior 1270, when radio frequency energy 1260 is applied to the resonator 1210.

Figure 13:
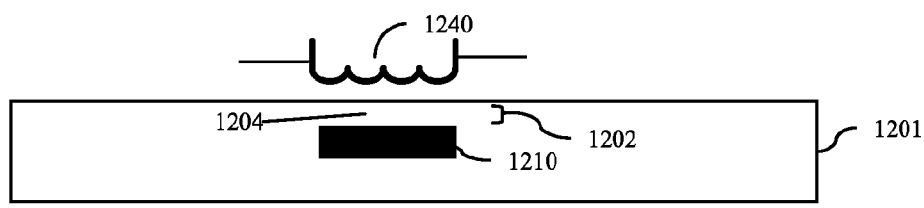
FIG. 13 is a block diagram illustrating an alternative configuration for the system of FIG. 12.

The interrogation unit 1240 can be adapted to wirelessly detect this resonant behavior. For example, the interrogation unit 1240 can comprise a wire coil with an input node 1291 adapted to receive a stimulus 1260 (e.g., to receive radio frequency energy in the form of a radio frequency pulse or sine voltage) at one end. The wire coil 1240 can further comprise an output node 1291 at the opposite end. Thus, during interrogation, the radio frequency signal 1260 is transmitted through the coil 1240 between the input node 1291 and output node 192. Additionally, during interrogation, the wire coil 1240 is place in close proximity to the passive resonator 1210 such that it is inductively coupled to the passive resonator 1210 without physically contacting it. For example, a space 1202 that has a predetermined height and is filled with either air 1203 (as illustrated in FIG. 12) or a dielectric material 1204 (as illustrated in FIG. 13) can separate the passive resonator 1210 from the wire coil interrogation unit 1240.

The stimulus source 1220 can be electrically connected to the input node 1291 of the interrogation unit 1240 and the sensor 1230 can be electrically connected the output node 1292 of the interrogation unit 1240. The stimulus source can be adapted to generate and apply a given stimulus 1260 (e.g., radio frequency energy) to the input node 1291. For example, the stimulus source 1220 can comprise a pulse generator adapted to generate and apply a radio frequency pulse to the input node 1291 of the interrogation unit. Alternatively, the stimulus source 1220 can comprise a sine sweep generator adapted to generate and apply a sine voltage to the input node 1291 of the interrogation unit. As mentioned above, during interrogation, the interrogator unit 1240 and resonator 1210 are inductively coupled such that the resonant behavior of the resonator 1210 in response to the applied radio frequency will impact the signal at the output node 1292.

The sensor 1230 can be adapted to sense and measure the actual behavior 1270 exhibited by the passive resonator in response to the stimulus 1260 (as detected by the interrogation unit). Specifically, if a pulse generator is used, the sensor 1230 can comprise a spectrum analyzer electrically connected between the output node 1292 of the interrogation unit 1240 and the analyzer 1250. This spectrum analyzer can be adapted to sense and measure the actual response of the resonator 1210 at the output node 1292, to generate a frequency spectrum (e.g., phase and amplitude vs. frequency) based on the actual response and to communicate the frequency spectrum to the analyzer 1250. If a sine sweep generator is used, the sensor 1230 can similarly comprise a spectrum analyzer electrically connected between the output node 1292 of the interrogation unit 1240 and the analyzer 1250 and adapted to sense and measure the actual response of the resonator 1210 at the output node 1292. However, the spectrum analyzer can be adapted to generate an amplitude spectrum and a phase spectrum based on the actual response and to communicate both spectrums to the analyzer 1250.

It should be understood that the stimulus source 1220 and sensor 1240 can comprise discrete transmit and receive units connected to the interrogation unit 1240, as illustrated. Alternatively, the stimulus source 1220 and sensor 1240 can comprise a combined transmit-receive unit for radio frequency signals.

The analyzer 1250 can be adapted to determine the value(s) for the one or more integrated circuit parameters based on the difference between the expected behavior (i.e., the optimal circuit behavior in the absence of process variations) and the actual behavior 1270 exhibited by the passive resonator 1210 in response to the radio frequency energy 1260 and depicted in the frequency, phase and/or amplitude spectrums. Specifically, the amplitude and phase response of the wire coil interrogation unit 1240 will be modified by the passive resonator 1210 and will vary according to targeted parametric variances. In this manner, the actual response curves for the behavior of the passive circuit 1210 itself can be extracted and used by the analyzer 1250 to determine the values for (i.e., effectively measure) the parameters of the integrated circuit.

Again, before determining the parameters, the analyzer 1250 must first normalize the measured data (e.g., using a data normalizer 1251) to account for scaling, offset and/or noise errors, which would prevent a direct correlation of parametric values to measurements. Such scaling, offset and noise errors can be due to placement of the wire coil interrogation unit 1240 and its distance from the resonator 1210. To ensure adequate normalization, the normalization can be performed against one or more reference frequencies and/or on a first order derivative of the measured data. That is, such measurement errors can be removed through application of the first order derivative of the data along with normalization. Normalization can further be combined with exploitation of targeted frequency ranges for targeted parametric sensitivities.

Figure 14:
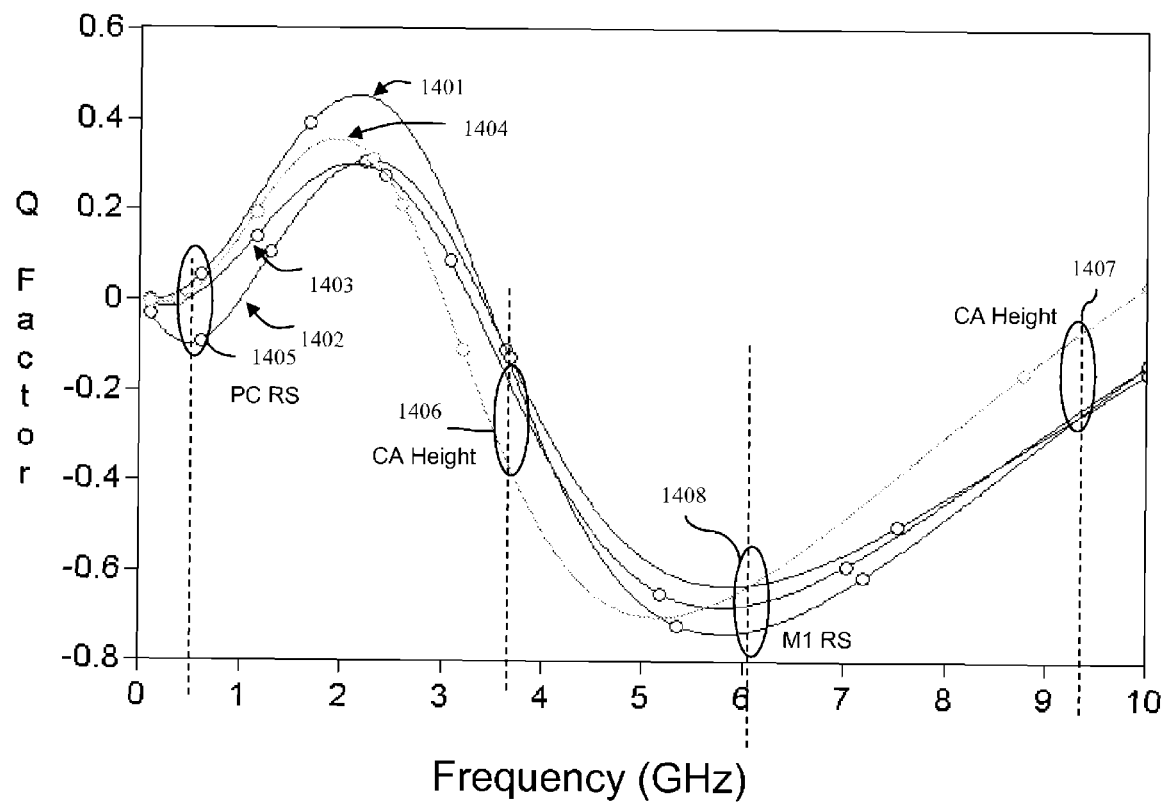
FIG. 14 is a graph illustrating an exemplary comparison between optimal resonant circuit behavior in the absence of process variations and resonant circuit behavior sensitive to independent process variations.

To then determine the values for the target integrated circuit parameters (i.e., to determine a parameter measurement based on the normalized data), the analyzer 1250 can access a database 1252 of simulation results that predict not only circuit 1210 behavior in the absence of process variations and but also in the presence of different process variations. Extraction and simulation demonstrate that the resonator structure 500 provides characteristic response curves in the GHz range, with such response characteristics deterministically variable in accordance to changes in certain targeted parametrics (e.g., contact 540 height, polysilicon sheet resistance in the resistor 520 and metal sheet resistance in the inductor 510). Specifically, there are characteristic frequency ranges dominated by each of the targeted parametric variability. FIG. 14 is a graph illustrating an exemplary comparison between optimal resonant circuit behavior in the absence of process variations and resonant circuit behavior sensitive to independent process variations. Specifically, curve 1401 illustrates resonator circuit behavior in the absence of process variations. Curves 1402-1404 illustrate resonator circuit behavior sensitivity to different independent process variations (e.g., where polysilicon conductivity is decreased by 30% in curve 1402, metal conductivity is decreased by 30% in curve 1403 and contact height is decreased by 30% in curve 1404). In this example, individual parametric variations can be calculated from one Q factor curve with polysilicon sheet resistance at low frequencies (see reference number 1405), with contact height at mid frequencies (see reference number 1406) or very high frequencies (see reference number 1407) and with metal sheet resistance at moderately high frequencies (see reference number 1408).

The output 1255 of the analyzer 1250 (i.e., the intra-process integrated circuit parameter measurements) can then be used to provide immediate control for parametric centering through in-process correction, for end point detection, for feedback corrections to prior process steps and/or for feedforward corrections to subsequent process steps.

As described in detail above, it is anticipated that the system embodiments of the present invention including system 1200 will ideally comprise one or more additional passive resonators to be interrogated by the same interrogation unit 1240 or by different interrogation units at the same time in order to more accurately determine the values for the integrated circuit parameters. These additional passive resonators can, for example, comprise resonators, such as those described above and illustrated in FIGS. 9-11, with different sensitivities to the integrated circuit parameters.

Figure 15:
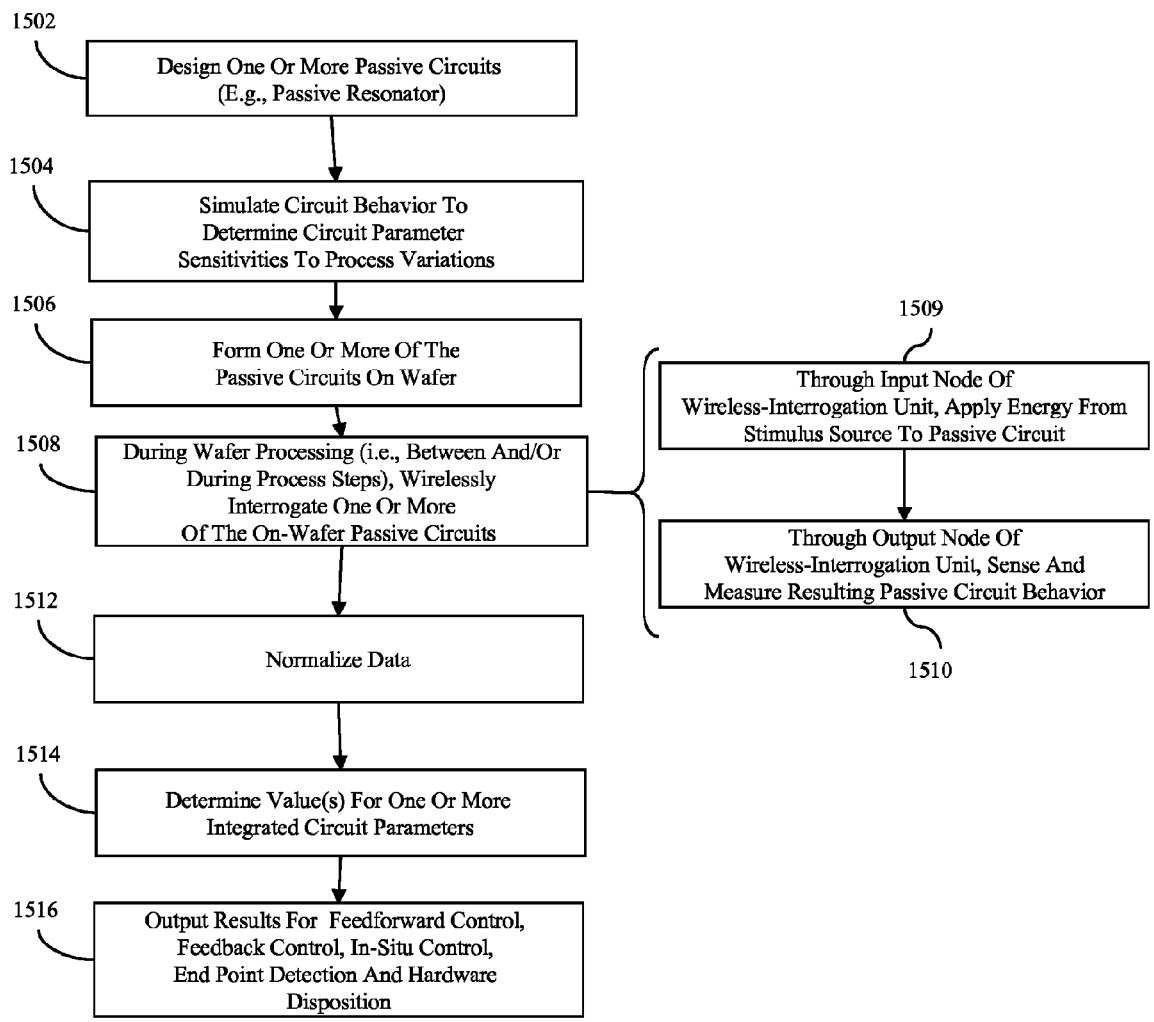
FIG. 15 is a flow diagram illustrating an embodiment of a method for wireless measurement of integrated circuit parameters.

Referring to FIG. 15, also disclosed are embodiments of an associated method for wireless measurement of integrated circuit parameters. The method embodiments comprise designing a passive circuit that exhibits, in response to a given stimulus, a give type of behavior capable of being wirelessly detected and that further has a predetermined sensitivity to process variations in one or more integrated circuit parameters (e.g., one or more physical or electrical integrated circuit parameters) (1502). For example, the passive circuit can be designed as a passive resonator 500, as described above and illustrated in FIG. 5, that exhibits resonant behavior in response to radio frequency energy (e.g., a radio frequency pulse or sine voltage) and that has a predetermined sensitivity to process variations in one or more integrated circuit parameters (e.g., polysilicon sheet resistance, metal sheet resistance or contact height). Following design, the passive circuit is simulated and, more specifically, the simulations are performed to predict not only circuit behavior in the absence of process variations and but also in the presence of different process variations (i.e., to determine sensitivities to process variations) (1504). Then, the passive circuit is formed on a wafer (1506).

During wafer processing (i.e., between and/or during process steps), this passive circuit can be wirelessly interrogated to determine the actual behavior exhibited by the passive circuit in response to an applied stimulus (1508). That is, a stimulus (e.g., radio frequency energy in the form of a pulse or sine voltage) is applied to the passive circuit from a stimulus source (e.g., a pulse generator or sine sweep generator) through the input node of an interrogation unit (e.g., a wire coil) (1509). The resulting circuit behavior is then sensed and measured by a sensor (e.g., a spectrum analyzer) through the output node of the interrogation unit (1510). Then, the actual behavior data (i.e., measured data) is communicated to an analyzer and normalized to account for scaling, offset and/or noise errors in measurements (1512), which can be due to variability in RF probe placement and distance from the passive circuit. A determination can be made as to the value (i.e., a measurement value) of the one or more integrated circuit parameters, based on a difference between the expected behavior (i.e., the optimal circuit behavior in the absence of process variations) and the actual behavior exhibited by the circuit (1514). The results of this determining process (i.e., the integrated circuit parameter measurements) can then be used in feedforward control, feedback control, in-situ control, end point detection and hardware disposition (1516).

As described above, the method embodiments comprise interrogating only one passive circuit on a wafer. However, it is anticipated that the method will ideally comprise designing and simulating multiple passive circuits at processes 1502-1504, forming multiple passive circuits on the waver at process 1506 and simultaneously multiple passive circuits at process 1508 in order to more accurately determine the values for the integrated circuit parameters.

For example, the wafer can be formed at process 1506 with at least one additional passive circuit with a different predetermined sensitivity to the process variations in the at least one integrated circuit parameter. The additional passive circuit can be wirelessly interrogated at process 1508, e.g., by a different wireless-interrogation unit, to determine the actual behavior exhibited by the additional passive circuit in response to the stimulus. The determining process 1514 can then be more accurate in that it is based, not only on the actual behavior exhibited by the first passive circuit (as detected by the first wireless-interrogation unit), but also on the difference between the expected behavior and the actual behavior exhibited by the additional passive circuit in response to the stimulus (as detected by the additional wireless-interrogation unit).

Alternatively, the wafer can be formed at process 1506 with an additional passive circuit with the same predetermined sensitivity to the process variations in the at least one integrated circuit parameter, but tuned differently than the passive circuit. Then, while the first passive circuit is being interrogated at process 1508, this additional passive circuit can also be interrogated (i.e., essentially simultaneously) by the same wireless-interrogation unit. The determining process 1514 can then be more accurate in that it is based, not only on the actual behavior exhibited by the first passive circuit (as detected by the wireless-interrogation unit), but also on the difference between the expected behavior and the actual behavior exhibited by the additional passive circuit in response to the stimulus (also as detected by the same wireless-interrogation unit). Because multiple passive circuits can be simultaneously interrogated at process 1508, the present inline measuring technique provides higher sampling rates and tighter process controls over prior art inline measuring techniques.

Additional Disclosure

Thus, as discussed above, U.S. patent application Ser. No. 12/053,705 disclosed embodiments of a system and a method that allow for wireless and dynamic intra-process measurements of integrated circuit parameters. These embodiments incorporated the use of a passive circuit, such as an inductor-capacitor-resistor (LCR) circuit resonator, that has a predetermined sensitivity to process variations in one or more physical or electrical integrated circuit parameters. The passive circuit, embodiments of which were also disclosed, could be wirelessly interrogated between and/or during process steps. Then, the actual behavior exhibited by the passive circuit in response to the wireless-interrogation could be compared to the expected behavior of an optimal circuit in the absence of process variations in order to measure value(s) for the one or more parameters. The measurements taken could be used to provide immediate control for parametric centering through in-process correction, for end point detection, for feedback corrections to prior process steps and/or for feed-forward corrections to subsequent process steps. Given the disclosed intra-process monitoring circuits of U.S. patent application Ser. No. 12/053,705 as well as other similar intra-process monitoring circuits, there is also now a need in the art for an improved design and manufacturing system as well as an improved design and manufacturing flow method that provide for chip design analysis and on-chip or within scribe line insertion of intra-process monitoring circuitry.

In view of the foregoing, disclosed herein are embodiments of a design and manufacturing system and an associated design and manufacturing flow method that allow for design analysis and for insertion, during wafer manufacture, of intra-process monitoring circuitry. These embodiments incorporate the use of a library of pre-qualified intra-process monitoring circuits and a cross-correlation table that links different monitoring circuits with different IC chip components. Specifically, these embodiments analyze integrated circuit (IC) chip design data to identify the various IC components designed into the chip. Then, one or more intra-process monitoring circuits are selected from the library and the design data is modified to include the selected monitoring circuit(s). Finally, a test program extension is generated for intra-process monitoring of at least one parameter using the selected monitoring circuit(s) and the manufacturing routing instructions are modified to incorporate the test program extension.

Figure 16:
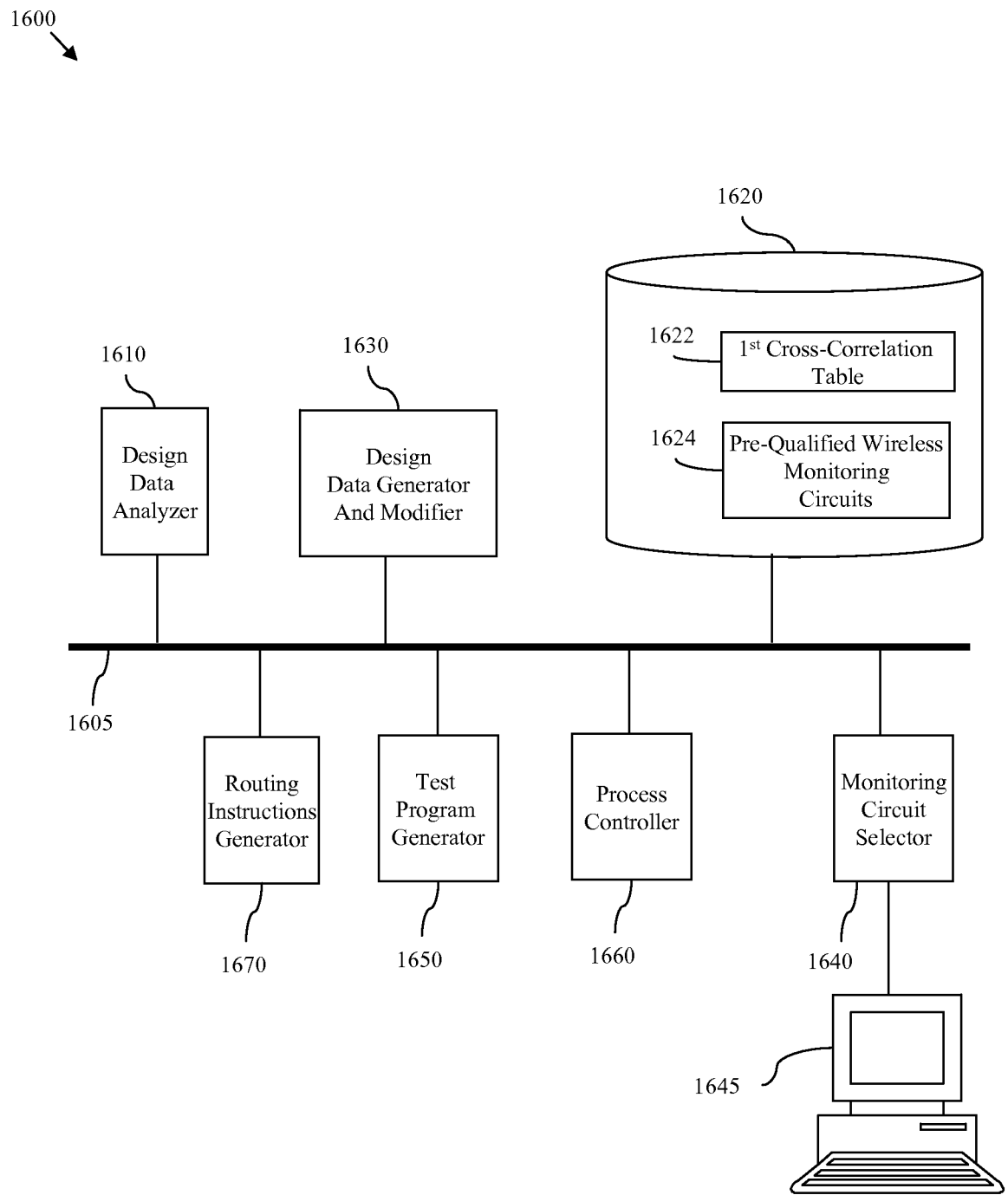
FIG. 16 is a block diagram illustrating an embodiment of an integrated circuit chip design and manufacturing system according to the present invention.

More particularly, referring to FIG. 16, disclosed herein are embodiments of a system 1600 for designing and manufacturing an IC chip. The system 1600 embodiments comprise a library 1620, a design data analyzer 1610, an intra-process monitoring circuit selector 1640, a graphical user interface 1645, and a design data editor 1630.

Specifically, the library 1620 can contain (i.e., store) a set of pre-qualified intra-process monitoring circuits 1624 and also a cross-correlation table 1622 that correlates different IC chip components (e.g., circuit types, cells, etc.) with different pre-qualified intra-process monitoring circuits 1624. That is, within the library 1620 a set of library elements for pre-qualified intra-process monitoring circuits 1624 can be registered (i.e. stored). Exemplary library elements can include, for example, the passive wireless intra-process monitoring circuits disclosed in U.S. patent application Ser. No. 12/053, 705 (e.g., see structures 500 of FIGS. 5-6, 900 of FIG. 9, 1000 of FIG. 10, and 1100 of FIG. 11) or any other suitable intra-process monitoring circuits. Each library element comprises a detailed description of a specific monitoring circuit, which has been designed or tuned to monitor one or more specific process-dependent parameters that can be linked into the chip design coverage requirements. Each library element may, more specifically, contain design files for a specific monitoring circuit, rules, models, or other items bundled and delivered with the design files. Pre-qualification for each library element may be for any one or more of performance, reliability, timing, etc. The cross-correlation table 1622, in turn, correlates (i.e., links) each specific monitoring circuit 1624 with one or more IC components that are known to possess the same or similar process-dependent parameter (s).

The design data analyzer 1610 can analyze design data. This design data can be representative of a design for a particular integrated circuit (IC) chip, which comprises a plurality of integrated circuit chip components (e.g., memory arrays, ESD input networks, input/outputs, analog circuitry, custom logic, etc.). For example, the design data can be in Graphic Data System II (GDSII) binary file or other similar format such that it represents information about the IC layout, including the various circuit components, in hierarchical form. Additionally, or alternatively, the design data can comprise a netlist that describes the connectivity of the particular IC chip design. Specifically, the design data analyzer 1610 can analyze this design data to identify the various IC chip components contained in the IC chip design. For example, the design data analyzer 1610 can comprise a scanner tool (e.g., a GDSII reader/scanner and/or a netlist reader/scanner) capable of scanning the design data to identify the various components of the IC chip design and the on-chip locations thereof. Thus, the design data analyzer 1610 can determine the various circuit types within a chip design and where within the chip those circuit types are to be located (i.e., the analyzer 1610 can determine across-chip block usage). Optionally, the design data analyzer 1610 can further use a cross-referencing table to identify similar IC chip components, which may be substituted, as necessary, for those specified in the original design data.

The intra-process monitoring circuit selector 1640 or a user through the use of a graphical user interface (GUI) 1645 can select, from the library 1620, one or more intra-process monitoring circuits 1624 for insertion onto a wafer, during fabrication. More particularly, intra-process monitoring circuit(s) 1624 can be selected from the library 1620 for insertion onto each one of multiple instances of a particular IC chip being formed on a wafer and/or for insertion within the scribe-lines between multiple instances of a particular IC chip being formed on a wafer.

This selection process can be performed automatically by the selector 1640 or by a user with guidance from a graphical user interface (GUI) 1645. Specifically, prior to selection of an intra-process monitoring circuit 1624 from the library 1620, either the selector 1640 (based on predetermined default criteria) or a user (based on guidance provided by the GUI 1645), must first select one or more particular IC chip components and one or more particular parameters thereof for which intra-process monitoring is desired. Selection of the particular component(s) and/or particular parameter(s) can be based, for example, on a component's relative importance to overall chip design, a parameter's relative importance to proper chip function and a known sensitivity of a parameter to process variations.

Next, the cross-correlation table 1622 is accessed (e.g., either automatically by the selector 1640 or by the user with guidance from the GUI 1645) and used to identify a sub-set of the pre-qualified intra-process monitoring circuits 1624 that have been correlated to a particular component and parameter thereof. That is, once the component(s) and/or parameter(s) are selected, the cross-correlation table 1622 is accessed to identify and select which intra-process monitoring circuit(s) 1624 to use. Selection of the intra-process monitoring circuit(s) 1624 from the sub-set can be based, for example, on the amount of coverage, allowable area growth (i.e., the available area on-chip and/or within scribe lines for such monitoring circuits), etc.

After the intra-process monitoring circuit(s) 1624 are selected, the design data editor 1630 can modify the design data to incorporate the selected intra-process monitoring circuit(s) 1624. That is, the design data is modified so as to imbed the selected intra-process monitoring circuit(s) 1624 into the wafer with optimal placement, either on-chip and/or within the wafer scribe lines, relative to the particular IC chip component(s) to be monitored. Thus, the modified design data allows intra-process monitoring of at least one parameter of at least one of the IC chip components during wafer fabrication. It should be noted that this design data editor 1630 can be, for example, the same tool that generated the original design data.

Other aspects of the system 1600 embodiments can include, but are not limited to, a test program generator 1650, a routing instructions generator 1670, and a process controller 1660. The test program generator 1650 can generate an extension to a previously generated test program in order to monitor (i.e., test), during wafer fabrication, one or more parameters using the selected intra-process monitoring circuit(s) 1624, which have been incorporated into the design data. Specifically, this test program extension comprises a supplemental test program that is not in the original test program for wafer final test. The supplemental test program can comprise, for example, pre-established test patterns for the selected intra-process monitoring circuit(s) so that when the wafer is at the targeted manufacturing test, the run time analysis of the selected and imbedded intra-process monitoring circuit will provide the crucial parameter measurement(s). It should be noted that this test program generator 1650 can be, for example, the same tool that generated the original test program for wafer final test.

The manufacturing routing instructions generator 1670 can modify manufacturing routing instructions for wafer fabrication so as to incorporate this test program extension. That is, the routing instructions generator 1670 can modify initial manufacturing routing instructions which define the sequence of process steps for manufacturing the wafer and can do so in order to incorporate any additional process steps required to form the monitoring circuit(s) and to perform the test program extension. It should be noted that this manufacturing routing instructions generator 1670 can be, for example, the same tool that generated the original manufacturing routing instructions.

Finally, the process controller 1660 can initiate the wafer manufacturing process according to the manufacturing routing instructions and can further adjust one or more process steps, in-situ, based on results obtained from performance of the test program extension, during wafer fabrication. In order to accomplish such process step adjustments, the process controller 1660 can communicate any necessary process step changes to the manufacturing routing instructions generator 1670 and the manufacturing routing instructions generator 1670 can further modify the manufacturing routing instructions in order to implement such changes.

It should be noted that the various system 1600 components discussed above (e.g., library 1620, design data analyzer 1610, intra-process monitoring circuit selector 1640, graphical user interface 1645, a design data editor 1630, routing instructions generator 1670, test program generator 1650, process controller 1660, etc.) can communicate directly or can communicate over a bus 1605, as illustrated.

Figure 17:
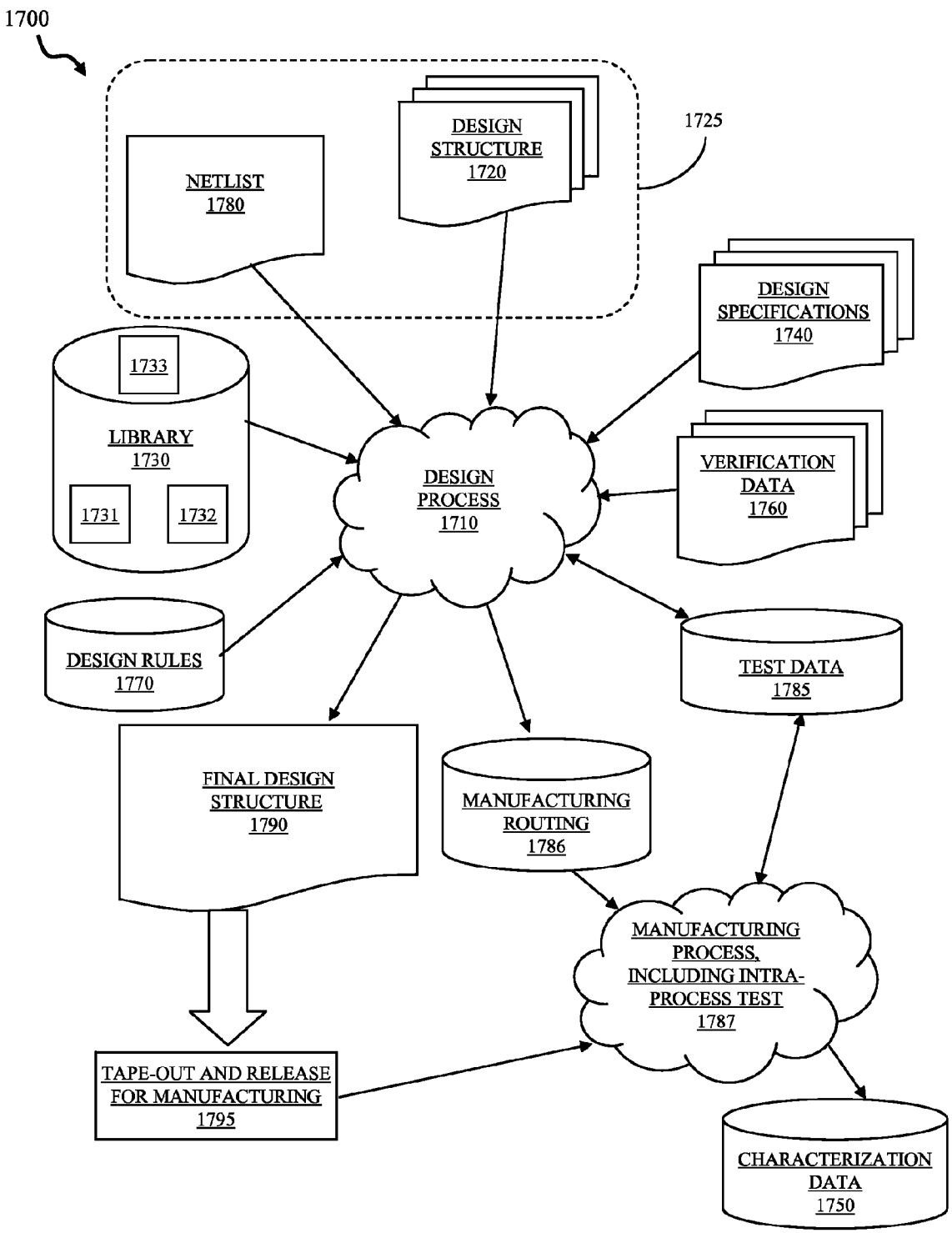
FIG. 17 is block diagram illustrating an embodiment of a design and manufacturing flow method according to the present invention.

Also disclosed herein are embodiments of an integrated circuit (IC) chip design and manufacturing flow method. FIG. 17 shows a block diagram of an exemplary design and manufacturing flow 1700 method according to the present invention that can be used, for example, in semiconductor IC logic design, simulation, test, layout, and manufacture. The design and manufacturing flow 1700 method comprises a design process 1710 portion and a manufacturing process 1787 portion. The design and manufacturing processes 1710, 1787 include processes, machines and/or mechanisms for processing design structures in order to produce a wafer with multiple instances of an IC chip according to a particular design, plus selected on-wafer (i.e., on-chip or within scribe line) circuits that allow for intra-process monitoring and, thereby, in-situ process control during wafer fabrication.

The intra-process monitoring circuits are selected during the design process 1710, as discussed in greater detail below, and may comprise, for example, any of the passive wireless intra-process monitoring circuits disclosed in U.S. patent application Ser. No. 12/053,705 (e.g., see structures 500 of FIGS. 5-6, 900 of FIG. 9, 1000 of FIG. 10, and 1100 of FIG. 11) or any other suitable intra-process monitoring circuits. Thus, the final design structure 1790 generated by design process 1710, which is taped-out and released for manufacturing 1795, may be encoded on machine-readable transmission or storage media to include data and/or manufacturing routing instructions 1786 that when executed by machines or otherwise processed on a data processing system, during the manufacturing process 1787, generate logically, structurally, mechanically, or otherwise functionally equivalent representations of the IC chip according to the particular design, plus the selected on-wafer intra-processing monitoring circuits. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

It should be noted that the design and manufacturing flow 1700 may vary depending on the type of representation being designed. For example, a design and manufacturing flow 1700 for building an application specific IC (ASIC) may differ from a design and manufacturing flow 1700 for designing a standard component or from design and manufacturing flow 1700 for instantiating the design into a programmable array, for example a programmable gate array (PGA) or a field programmable gate array (FPGA) offered by Altera® Inc. or Xilinx® Inc.

FIG. 17 illustrates multiple design structures including a design structure 1720 that is preferably processed by a design process 1710. Design structure 1720 may be a logical simulation design structure generated and processed by design process 1710 to produce a logically equivalent functional representation of a hardware device. Design structure 1720 may also or alternatively comprise data and/or program instructions that when processed by design process 1710, generate a functional representation of the physical structure of a hardware device. Whether representing functional and/or structural design features, design structure 1720 may be generated using electronic computer-aided design (ECAD) such as implemented by a core developer/designer. When encoded on a machine-readable data transmission, gate array, or storage medium, design structure 1720 may be accessed and processed by one or more hardware and/or software modules within design process 1710 to simulate or otherwise functionally represent the various integrated circuit (IC) chip components of a particular IC chip design. As such, design structure 1720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++. Such data structures may also or alternatively include Graphic Data System II (GDSII) binary file or other similar formats that represent information about the IC layout, including the various circuit components, in hierarchical form.

Design process 1710 preferably employs and incorporates hardware and/or software modules for synthesizing, translating, or otherwise processing a design/simulation functional equivalent of particular integrated circuit design to generate a netlist 1780 which may contain design structures such as input design structure 1720. Netlist 1780 may comprise, for example, compiled or otherwise processed data structures representing a list of wires, discrete components, logic gates, control circuits, I/O devices, models, etc. that describes the connections to other elements and circuits in an integrated circuit design. Netlist 1780 may be synthesized using an iterative process in which netlist 1780 is resynthesized one or more times depending on design specifications and parameters for the device. As with other design structure types described herein, netlist 1780 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 1710 may include hardware and software modules for processing a variety of input data structure types including netlist 1780. Such data structure types may reside, for example, within library elements 1733 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1740, characterization data 1750, verification data 1760, design rules 1770, and test data files 1785 which may include input test patterns, output test results, and other testing information.

Design process 1710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1710 without deviating from the scope and spirit of the invention. Design process 1710 may also include modules for performing standard circuit design processes such as timing analysis, verification, design rule checking, place and route operations, etc.

Design process 1710 employs and incorporates logic and physical design tools such as HDL compilers and simulation model build tools to process input design structure 1720 together with some or all of the depicted supporting data structures along with any additional mechanical design or data (if applicable), to generate a second (final) design structure 1790. Design structure 1790 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures).

The final design structure 1790 preferably comprises one or more files, data structures, or other computer-encoded data or instructions that reside on transmission or data storage media and that when processed by an ECAD system generate multiple logically or otherwise functionally equivalent representations of an IC chip on a wafer according to the particular design, plus selected on-wafer (i.e., on-chip or within scribe line) circuits that allow for intra-process monitoring and, thereby, allow for in-situ process control during wafer fabrication. The final design structure 1790 may also employ a data format used for the exchange of layout data of integrated circuits and/or symbolic data format (e.g. information stored in a GDSII (GDS2), GL1, OASIS, map files, or any other suitable format for storing such design data structures). The final design structure 1790 may comprise information such as, for example, symbolic data, map files, test data files, design content files, manufacturing data, layout parameters, wires, levels of metal, vias, shapes, data for routing through the manufacturing line (i.e., manufacturing routing instructions), and any other data required by a manufacturer or other designer/developer to produce, on a wafer, IC chips (according to a particular design) and the selected on-wafer intra-process monitoring circuits. The final design structure 1790 may then proceed to a stage 1795 where, for example, the final design structure 1790 proceeds to tape-out, is released to manufacturing 1787, is released to a mask house, is sent to another design house, is sent back to the customer, etc.

Figure 18:
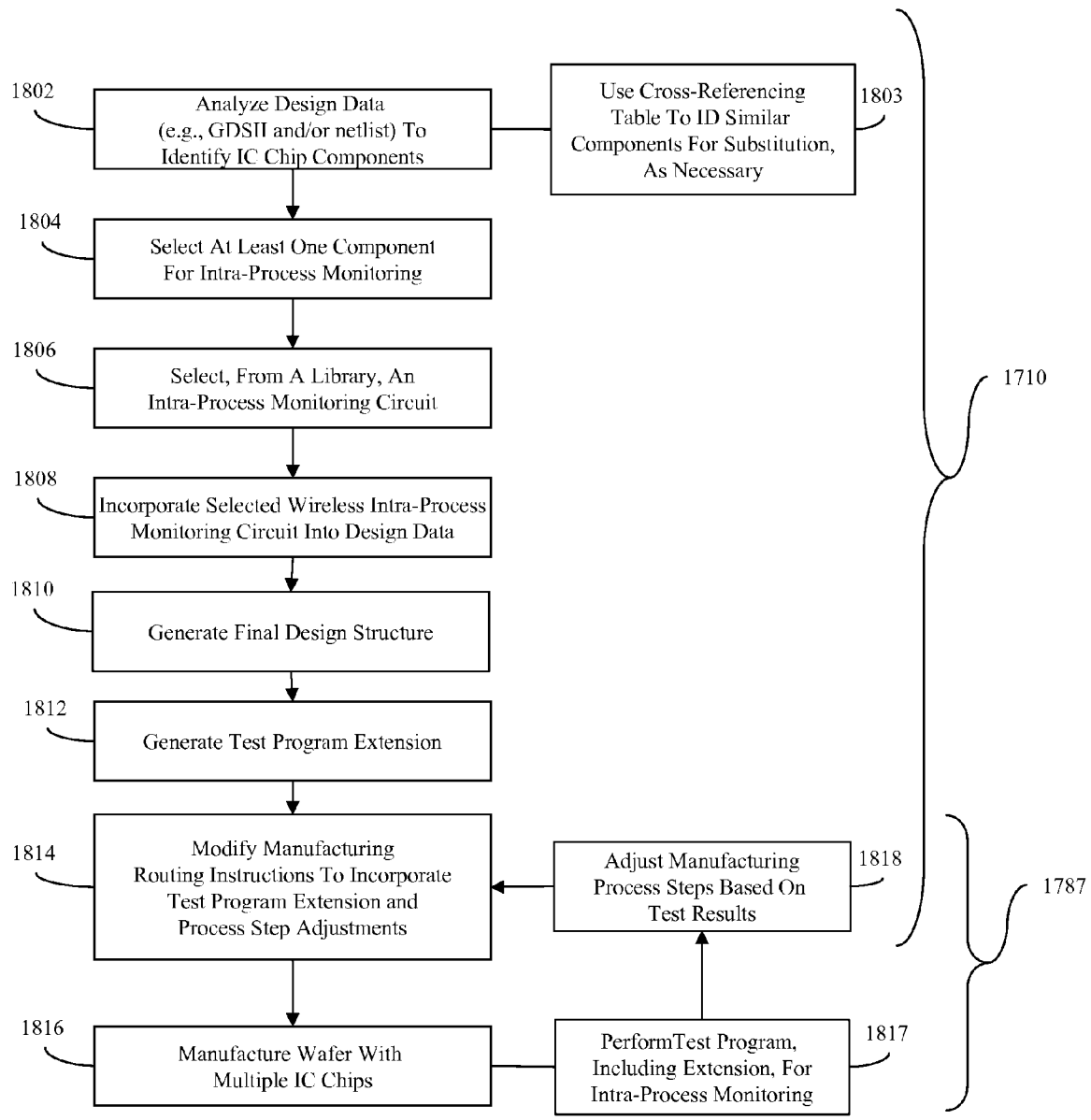
FIG. 18 is a flow diagram further detailing the design and manufacturing processes of FIG. 17.

Referring to FIGS. 17 and 18 in combination, in order to generate a final structure 1790, which is described above and which can be used to produce wafers having multiple IC chips (according to a particular design) and further having selected intra-process monitoring circuits, the design process 1710 comprises additional steps, over a conventional design flow methodology. These additional steps allow for the insertion of such intra-process monitoring circuit(s) into the input design structure. Specifically, the design process 1710 comprises analyzing design data 1725 in order to identify various IC chip components (e.g., memory arrays, ESD input networks, input/outputs, analog circuitry, custom logic, etc.) contained in a particular IC chip design (1802). The design data 1725 can be data representative of the particular IC chip design. For example, the design data 1725 can comprise an input design structure 1720 and/or a netlist 1780 generated during the design process 1710, based on the input design structure 1720.

The design data 1725 (i.e., the input design structure 1720 and/or the netlist 1780) is analyzed to identify the various IC chip components contained in the particular IC chip design, as represented by the design data 1720. This analyzing process can comprise employing hardware and/or software modules, such as the design data analyzer discussed above, to scan the design data (i.e., to scan the design structure 1720 and/or the netlist 1780) in order to determine the various circuit types within the chip design and further to determine where within the chip those circuit types are to be located. Thus, this analyzing process can determine across-chip block usage. Optionally, this analyzing process can further comprise using a cross-referencing table to identify similar IC chip components, which may be substituted, as necessary, for those specified in the original design data (1803).

The design process 1710 further comprises identifying, from the previously identified IC components contained in the chip design, one or more particular IC chip components and one or more particular parameters thereof for which intra-process monitoring is desired (1804). Selection of the particular component(s) and particular parameter(s) can be based, for example, on a component's relative importance to overall chip design, a parameter's relative importance to proper chip function and a known sensitivity of a parameter to process variations. This selection process can be accomplished automatically through the use of hardware and/or software modules, such as the intra-process monitoring circuit selector as discussed above. Alternatively, it may be accomplished by a user through the use of a graphical user interface (GUI), also as discussed above.

Next, the design process 1710 comprises selecting, from a library 1730, one or more intra-process monitoring circuits 1731 for insertion onto a wafer, during fabrication, in order to monitor the selected component(s) and parameter(s) thereof (1806). Specifically, the library 1730 can contain a set of pre-qualified intra-process monitoring circuits 1731 and also a cross-correlation table 1732 that correlates different integrated circuit chip components (e.g., circuit types, cells, etc.) with different pre-qualified intra-process monitoring circuits 1731. That is, within the library 1730 a set of library elements for pre-qualified intra-process monitoring circuits 1731 can be registered and stored. Exemplary library elements can include, for example, the passive wireless intra-process monitoring circuits disclosed in U.S. patent application Ser. No. 12/053,705 (e.g., see structures 500 of FIGS. 5-6, 900 of FIG. 9, 1000 of FIG. 10, and 1100 of FIG. 11) or any other suitable intra-process monitoring circuits. Each library element comprises a detailed description of a specific monitoring circuit, which has been designed or tuned to monitor one or more specific process-dependent parameters that can be linked into the chip design coverage requirements. Each library element may, more specifically, contain design files for a specific monitoring circuit, rules, models, or other items bundled and delivered with the design files. Pre-qualification for each library element may be for any one or more of performance, reliability, timing, etc. The cross-correlation table 1732, in turn, correlates (i.e., links) each specific monitoring circuit 1731 with one or more IC components that are known to possess the same or similar process-dependent parameter(s).

Intra-process monitoring circuit(s) are selected from the library 1730 for insertion onto each one of multiple instances of a particular IC chip that will be formed on a wafer during manufacturing process 1787 and/or for insertion within the scribe-lines between multiple instances of a particular IC chip that will be formed on a wafer during manufacturing process 1787. Specifically, the cross-correlation table 1732 is accessed and used to identify a sub-set of the pre-qualified intra-process monitoring circuits 1731 that have been correlated to the particular component and/or parameter thereof, as previously selected. Selection of the intra-process monitoring circuit(s) 1731 can be based, for example, on the amount of coverage, allowable area growth (i.e., the available area on-chip and/or within scribe lines for such monitoring circuits), etc. This selection process can be accomplished automatically through the use of hardware and/or software modules, such as the intra-process monitoring circuit selector as discussed above. Alternatively, it may be accomplished by a user through the use of a graphical user interface (GUI), also as discussed above.

Once the monitoring circuit(s) are selected, the design data 1725 (e.g., input design structure 1720 and/or netlist 1780) is modified to incorporate the selected on-wafer wireless monitoring circuit(s) in order to allow wireless intra-process monitoring, during wafer fabrication, of at least one parameter of at least one of the components (1808). That is, the design data is modified so as to imbed the previously selected intra-process monitoring circuit(s) 1731 into the wafer with optimal placement, either on-chip and/or within the wafer scribe lines, relative to the particular IC chip component(s) to be monitored. Thus, the modified design data allows intra-process monitoring of at least one parameter of at least one of the IC chip components during wafer fabrication. It should be noted that this design data modification process can be performed by the same tool that generated the original design structure 1720 or netlist 1780. Once the design data is modified, the design process 1710 continues, as discussed above, in order to generate the final design structure 1790 (1810).

The design process 1710 can further comprise generating an extension to a test program 1785 to allow for wireless intra-process monitoring, during wafer fabrication, of at least one parameter using the selected wireless monitoring circuit(s) (1812). Specifically, an extension to a previously generated test program can be generated (e.g., by a test program generator, as discussed above) in order to monitor, during wafer fabrication, one or more parameters using the selected intra-process monitoring circuit(s), which have been incorporated into the design data. This test program extension can comprise a supplemental test program that is not in the original test program for wafer final test. The supplemental test program can comprise, for example, pre-established test patterns for the selected intra-process monitoring circuit(s) so that when the wafer is at the targeted manufacturing test, the run time analysis of the selected and imbedded intra-process monitoring circuit will provide the crucial parameter measurement(s). Furthermore, the design process 1710 can comprise modifying manufacturing routing instructions 1786 to include additional process steps required to form the selected monitoring circuit(s) and further to incorporate the extension (1814). Specifically, manufacturing routing instructions 1786, which define the sequence of process steps for manufacturing the wafer during manufacturing process 1787, can be modified so as to incorporate any additional process steps required to fabricate the selected monitoring circuit(s) either on-chip or within the scribe lines and also to perform the test program extension.

Once the final design structure 1790 is generated (1810), the test program extension is generated (1812) and the manufacturing routing instructions are modified (1814), the wafer manufacturing process 1787 can be initiated (1816). That is, the manufacturing routing instructions 1786 can be executed so as to form wafers comprising both multiple instances of an IC chip according to the particular design and selected on-wafer (i.e., on-chip or within scribe lines) intra-process monitoring circuits. During this manufacturing process and as instructed by the manufacturing routing instructions, the test program extension can be performed (1817). Based on the test program extension results, at least one process step can be adjusted (1818). Implementation of such process step adjustments can be accomplished by means of further modifying the manufacturing routing instructions 1786. Thus, as a function of the intra-process monitoring (1816) and in-situ process control (1817), the design and manufacturing processes 1710 and 1787 overlap.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 19:
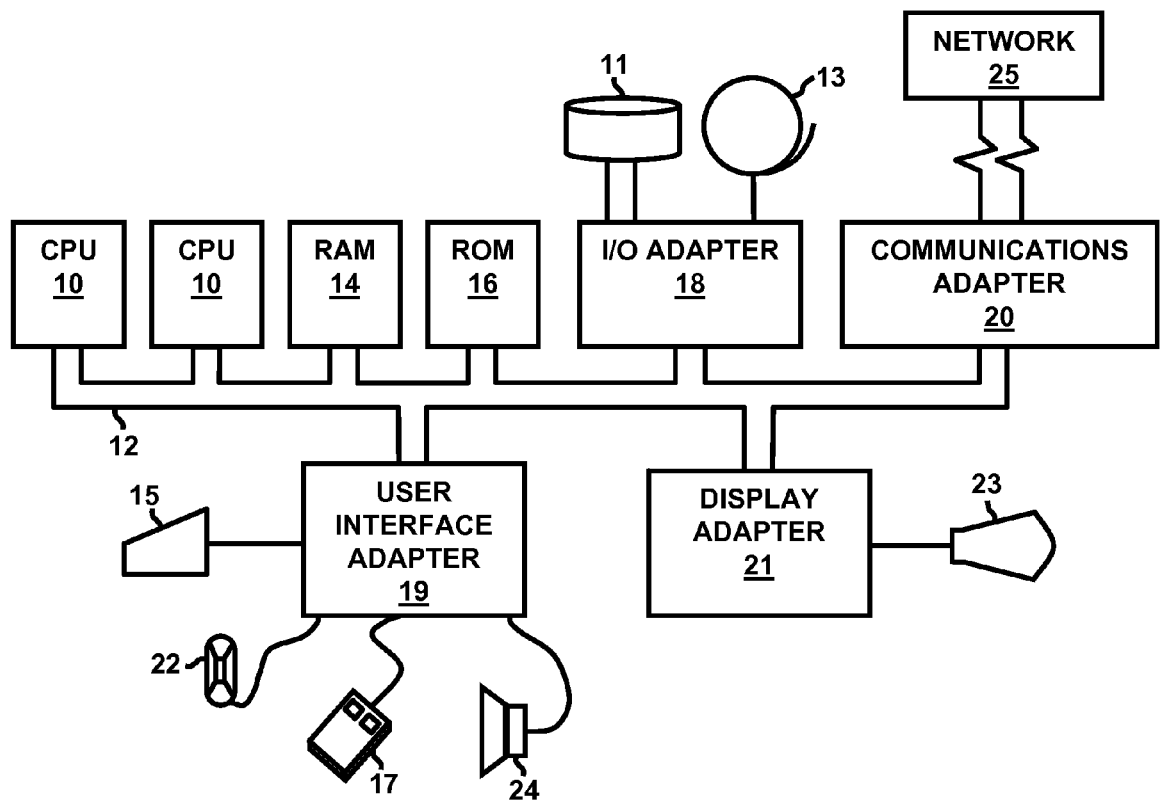
FIG. 19 is a schematic diagram illustrating an exemplary hardware environment that can be used to implement the embodiments of the invention.

A representative hardware environment for practicing the embodiments of the invention is depicted in FIG. 19. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

Therefore, disclosed above are embodiments of a design and manufacturing system and an associated design and manufacturing flow method that allow for design analysis and for insertion, during wafer manufacture, of intra-process monitoring circuitry. These embodiments incorporate the use of a library of pre-qualified intra-process monitoring circuits and a cross-correlation table that links different monitoring circuits with different IC chip components. Specifically, these embodiments analyze integrated circuit (IC) chip design data to identify the IC components designed into the chip. Then, one or more intra-process monitoring circuits are selected from the library and the design data is modified to include the selected monitoring circuit(s). Finally, a test program extension is generated for intra-process monitoring of at least one parameter using the selected monitoring circuit(s) and the manufacturing routing instructions are modified to incorporate the test program extension.

What is claimed is:

1. A system for designing and manufacturing an integrated circuit chip, said system comprising:
   an analyzer receiving design data representative of a design of an integrated circuit chip, said design comprising a plurality of integrated circuit chip components and said analyzer further analyzing said data to identify said components;
   a library comprising a set of pre-qualified intra-process monitoring circuits; and
   a design data editor modifying said design data to incorporate at least one intra-process monitoring circuit selected from said library in order to allow intra-process monitoring of at least one process-dependent parameter of at least one of said components of said integrated circuit chip during fabrication of a wafer that comprises multiple instances of said integrated circuit chip, said process-dependent parameter comprising any one of an electrical parameter and a physical parameter of said at least one of said components.

2. The system of claim 1, further comprising a test program generator generating an extension to a test program in order to monitor, during said fabrication of said wafer, said at least one parameter using said at least one intra-process monitoring circuit.

3. The system of claim 2, further comprising a routing instructions generator modifying routing instructions for said fabrication of said wafer so as to incorporate said extension.

4. The system of claim 2, further comprising a process controller, said process controller adjusting at least one process step based on results obtained from performance of said extension, during said fabrication.

5. The system of claim 1, said design data comprising at least one of an integrated circuit layout and a netlist.

6. The system of claim 1, further comprising any one of the following:
   a monitoring circuit selector automatically selecting said at least one intra-process monitoring circuit based on pre-determined criteria; and
   a user interface allowing a user to select said at least one intra-process monitoring circuit.

7. The system of claim 6,
   said library further comprising a cross-correlation table that correlates different integrated circuit chip components with different pre-qualified intra-process monitoring circuits, and
   one of said user and said selector accessing said cross-correlation table to identify a sub-set of said pre-qualified intra-process monitoring circuits that have been correlated to a particular component and selecting said at least one intra-process monitoring circuit from said sub-set.

8. The system of claim 7, said selecting of said at least one intra-process monitoring circuit from said sub-set being based on a desired parameter to be monitored.

9. The system of claim 7, said selecting of said at least one intra-process monitoring circuit from said sub-set being based on one of available area on-chip and available area within scribe lines.

10. The system of claim 7, said at least one intra-process monitoring circuit comprising one of an on-chip circuit and a within scribe line circuit.

11. An integrated circuit chip design flow method comprising:
    analyzing design data, said design data being representative of a design of an integrated circuit chip comprising a plurality of integrated circuit chip components and said analyzing comprising identifying said components;
    selecting at least one intra-process monitoring circuit from a library, said library comprising a set of pre-qualified intra-process monitoring circuits; and
    modifying said design data to incorporate said at least one intra-process monitoring circuit in order to allow intra-process monitoring of at least one process-dependent parameter of at least one of said components of said integrated circuit chip during fabrication of a wafer that comprise multiple instances of said integrated circuit chip, said process-dependent parameter comprising any one of an electrical parameter and a physical parameter of said at least one of said components.

12. The method of claim 11, said design data comprising at least one of an integrated circuit layout and a netlist.

13. The method of claim 11, said library further comprising a cross-correlation table that correlates different integrated circuit chip components with different pre-qualified intra-process monitoring circuits and said selecting of said at least one intra-process monitoring circuit comprising:
    using said cross-correlation table to identify a sub-set of said pre-qualified intra-process monitoring circuits that have been correlated to a particular component; and
    selecting said at least one intra-process monitoring circuit from said sub-set.

14. The method of claim 13, said selecting of said at least one intra-process monitoring circuit from said sub-set comprising selecting said at least one intra-process monitoring circuit based on a desired parameter to be monitored.

15. The method of claim 13, said selecting of said at least one intra-process monitoring circuit from said sub-set comprising selecting said at least one intra-process monitoring circuit based on one of available area on-chip and available area within scribe lines.

16. The method of claim 11, said at least one intra-process monitoring circuit comprising one of an on-chip circuit and a within scribe line circuit.

17. An integrated circuit chip design flow and fabrication method comprising:
    analyzing design data, said design data being representative of a design of an integrated circuit chip comprising a plurality of integrated circuit chip components and said analyzing comprising identifying said components;
    selecting at least one intra-process monitoring circuit from a library, said library comprising a set of pre-qualified intra-process monitoring circuits;

modifying said design data to incorporate said at least one intra-process monitoring circuit;

generating an extension to a test program to allow for intra-process monitoring of at least one process-dependent parameter of at least one of said components of said integrated circuit chip using said at least one intra-process monitoring circuit during fabrication of a wafer comprising multiple instances of said integrated circuit chip, said process-dependent parameter comprising any one of an electrical parameter and a physical parameter of said at least one of said components; and modifying routing instructions to incorporate said extension.

18. The method of claim 17, further comprising, during said fabrication, performing said extension of said test program, and based on results of said performing, adjusting at least one process step.

19. The method of claim 17, said design data comprising at least one of an integrated circuit layout and a netlist.

20. The method of claim 17, said library further comprising a cross-correlation table that correlates different integrated circuit chip components with different pre-qualified intra-process monitoring circuits and said selecting of said at least one intra-process monitoring circuit comprising:

using said cross-correlation table to identify a sub-set of said pre-qualified intra-process monitoring circuits that have been correlated to a particular component; and selecting said at least one intra-process monitoring circuit from said sub-set.

\* \* \* \* \*